(12) United States Patent
Senecal et al.

(10) Patent No.: US 12,473,383 B2
(45) Date of Patent: Nov. 18, 2025

(54) TRANSITION METAL CATALYSTS FOR OLEFIN POLYMERIZATION

(71) Applicant: Dow Global Technologies LLC, Midland, TX (US)

(72) Inventors: Todd D. Senecal, Midland, MI (US); David M. Pearson, Lake Jackson, TX (US); Roxanne M. Jenkins, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 739 days.

(21) Appl. No.: 17/772,910

(22) PCT Filed: Oct. 20, 2020

(86) PCT No.: PCT/US2020/056481
§ 371 (c)(1),
(2) Date: Apr. 28, 2022

(87) PCT Pub. No.: WO2021/086682
PCT Pub. Date: May 6, 2021

(65) Prior Publication Data
US 2023/0002515 A1 Jan. 5, 2023

Related U.S. Application Data

(60) Provisional application No. 62/928,098, filed on Oct. 30, 2019.

(51) Int. Cl.
| | | |
|---|---|---|
| C08F 4/64 | (2006.01) | |
| C07F 7/00 | (2006.01) | |
| C08F 10/02 | (2006.01) | |
| C08F 210/16 | (2006.01) | |

(52) U.S. Cl.
CPC ............ *C08F 4/64186* (2013.01); *C07F 7/00* (2013.01); *C08F 4/64044* (2013.01); *C08F 210/16* (2013.01)

(58) Field of Classification Search
CPC ........ C07F 17/00; C07F 7/00; C08F 4/64044; C08F 4/64186
See application file for complete search history.

(56) References Cited

U.S. PATENT DOCUMENTS 5,041,584 A * 8/1991 Crapo ................. C07F 5/068
556/179

FOREIGN PATENT DOCUMENTS

| WO | 2003091292 A2 | 11/2003 |
| WO | 2006049699 A1 | 5/2006 |

OTHER PUBLICATIONS

Huang et al. Organometallics 2001, 20, 5788-5791. (Year: 2001).*
Zaher et al. J. Organomet. Chem 2008, 693, 3889-3896. (Year: 2008).*
Barnea et al. Dalton Trans. 2008, 4050-4054. (Year: 2008).*
Huang, J.-H.; Chi, L.-S.; Yu, R.-C.; Jiang, G.J.; Yang, W.-T; Lee, G.-H.; Peng, S.-M. Organometallics 2001, 20, 5788-5791. (Year: 2001).*
Brazil Office Action dated Dec. 12, 2023, pertaining to BR Patent Application No. BR112022007828.5, 4 pgs.
Zaher et al. "Titanium complexes bearing bidentate benzimidazole-containing ligands and their behavior in ethylene polymerization", Journal of Organometallic Chemistry, vol. 693. No. 26, Dec. 15, 2008, pp. 3889-3896.
Stephen Difranco et al. "Single-site N—N bond cleavage for Mo(iv): possible mechanisms of hydrazido(1-) to nitrido conversion", Dalton Transactions, vol. 42, No. 7, Dec. 5, 2012, 2530-2539.
Jia-Wei Hsu et al. "Zirconium complexes incorporated with asymmetrical tridentate pincer type mon- and di-anionic pyrrolyl ligands: mechanism and reactivity as catalytic precursors", Dalton Transactions, vol. 41, No. 25, May 23, 2012, p. 7700.
Guofu Zi et al. "Synthesis, structure, and catalytic activity of titanium(IV) and zirconium(IV) amides with chiral biphenyldiamine-basedl igands", Journal of Organometallic Chemistry, vol. 695, No. 5, Mar. 1, 2010, pp. 730-739.
Eyal Barnea et al. "Zirconium complexes bearing a tetradentate dipyrrolyl ligand", Dalton Transactions, No. 30, Jun. 26, 2008, p. 4050.
International Search Report & Written Opinion issued in corresponding PCT Application No. PCT/US2020/056481 mailed on Jan. 27, 2021.
Japanese Office Action dated Nov. 26, 2024, pertaining to JP Patent Application No. 2022-522372, 10 pgs.
Chen, A Predictability Selective Aliphatic C—H Oxidation Reaction for Complex Molecule Synthesis, Science Magazine Org, Nov. 2, 2007, pp. 783-788, vol. 318.
Huang, Zirconium Complexes Containing Bidentate Pyrrole Ligands: Synthesis, Structural Characterization and Ethylene Polymerization, Organometallics, 2001, pp. 5788-5791, American Chemical Society.
Matsugi, New Titanium Complexes Bearing Two Indolide-Imine Chelate Ligands for the Polymerization of Ethylene, Macromolecules, 2002, pp. 4880-4887, American Chemical Society.
Sergeeva, Salan ligands assembled around chiral bipyrrolidine: predetermination of chirality around octahedral Ti and Zr centres, Journal The Royal Socity of Chemistry, 2009, pp. 3053-3055.

(Continued)

*Primary Examiner* — Rip A Lee
(74) *Attorney, Agent, or Firm* — Dinsmore & Shohl LLP

(57) ABSTRACT

Processes of polymerizing olefin monomers using catalyst systems and catalysts systems that include a procatalyst having a structure according to formula (I):

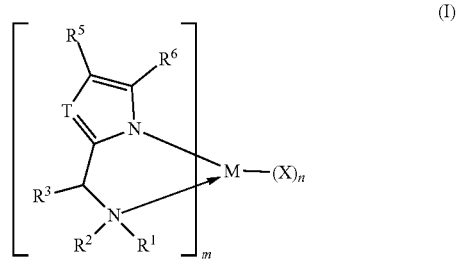

19 Claims, No Drawings

(56) References Cited

OTHER PUBLICATIONS

Wölfle, On the way to biodegradable poly(hydroxy butyrate) from propylene oxide and carbon monoxide via β-butyrolactone: Multisite catalysis with newly designed chiral indole-imino chromium (III) complexes, J. Organomet. Chem. 2009, 694, 2493-2512.
Singapore Office Action dated Mar. 13, 2025, pertaining to SG Patent Application No. 11202204270Y, 7 pgs.
Communication pursuant to Article 94(3) EPC dated Jul. 14, 2025, pertaining to EP Patent Application No. 20803403.3, 5 pgs.
Korean Office Action dated Aug. 12, 2025, pertaining to KR Patent Application No. 10-2022-7017651, 17 pgs.

\* cited by examiner

TRANSITION METAL CATALYSTS FOR OLEFIN POLYMERIZATION

CROSS-REFERENCE TO RELATED APPLICATIONS

This application is a national-stage application under 35 U.S.C. § 371 of International Application No. PCT/US2020/056481, filed Oct. 20, 2020 which claims priority to U.S. Provisional Patent Application No. 62/928,098, filed on Oct. 30, 2019, the entire disclosures of which are hereby incorporated by reference.

TECHNICAL FIELD

Embodiments of the present disclosure generally relate to olefin polymerization catalyst systems and processes, and, more specifically, the synthesis heterocyclic ligands, such as five-membered nitrogen-containing heterocycles like pyrrole or indole. The heterocyclic ligand can complex to group IV transition metal to form catalysts for olefin polymerization.

BACKGROUND

Olefin-based polymers such as polyethylene, ethylene-based polymers, polypropylene, and propylene-based polymers are produced via various catalyst systems. Selection of such catalyst systems used in the polymerization process of the olefin-based polymers is an important factor contributing to the characteristics and properties of such olefin based polymers.

Ethylene-based polymers and propylene-based are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and, optionally, one or more co-monomers are present in liquid diluents (such as solvents), such as an alkane or isoalkane, for example isobutane. Hydrogen may also be added to the reactor. The catalyst systems for producing ethylene-based polymers may typically comprise a chromium-based catalyst system, a Ziegler-Natta catalyst system, and/or a molecular (either metallocene or non-metallocene (molecular)) catalyst system. The reactants in the diluent and the catalyst system are circulated at an elevated polymerization temperature around the reactor, thereby producing ethylene-based homopolymer or copolymer. Either periodically or continuously, part of the reaction mixture, including the polyethylene product dissolved in the diluent, together with unreacted ethylene and one or more optional co-monomers, is removed from the reactor. The reaction mixture, when removed from the reactor, may be processed to remove the polyethylene product from the diluent and the unreacted reactants, with the diluent and unreacted reactants typically being recycled back into the reactor. Alternatively, the reaction mixture may be sent to a second reactor, serially connected to the first reactor, where a second polyethylene fraction may be produced. Despite the research efforts in developing catalyst systems suitable for olefin polymerization, such as polyethylene or polypropylene polymerization, there is still a need to increase the efficiencies of catalyst systems that are capable of producing polymer with high molecular weights and a narrow molecular weight distribution.

SUMMARY

Embodiments of this disclosure includes a catalyst system comprising a metal-ligand complex according to formula (I):

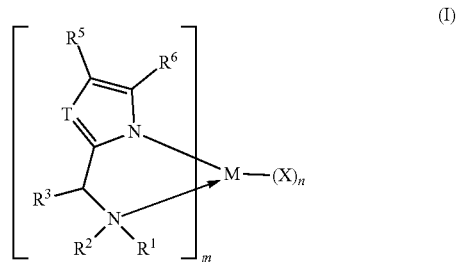

In formula (I), M is a metal chosen from titanium, zirconium, or hafnium, the metal having a formal oxidation state of +2, +3, or +4. Each X is a monodentate or bidentate ligand independently chosen from unsaturated $(C_2-C_{50})$hydrocarbon, unsaturated $(C_2-C_{50})$heterohydrocarbon, $(C_1-C_{50})$hydrocarbyl, $(C_1-C_{50})$heterohydrocarbyl, $(C_6-C_{50})$aryl, $(C_6-C_{50})$heteroaryl, cyclopentadienyl, substituted cyclopentadienyl, $(C_4-C_{12})$diene, halogen, $-N(R^N)_2$, and $-NCOR^C$; subscript n is 1, 2, or 3; and subscript m is 1 or 2. The metal-ligand complex has 6 or fewer metal-ligand bonds.

In formula (I), each T is nitrogen or $CR^4$, in which each $R^4$ is independently chosen from $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, halogen, or $-H$. Each $R^1$ is independently selected from the group consisting of an aliphatic $(C_1-C_{50})$hydrocarbyl, an aliphatic $(C_1-C_{50})$heterohydrocarbyl, -halogen, and $-H$, and, when m is 2, two $R^1$ are optionally covalently linked. Each $R^2$ is independently chosen from $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, and $-Ge(R^C)_3$, and $R^1$ and $R^2$ are optionally covalently connected to form a ring structure.

In formula (I), each $R^3$ and each $R^5$ is independently chosen from $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R)-$, $(R^C)_2NC(O)-$, halogen, or $-H$. Each $R^6$ is independently chosen from $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R)-$, $(R^C)_2NC(O)-$, or halogen; $R^5$ and $R^6$ are optionally covalently connected to form a ring structure; and each $R^C$ and $R^N$ in formula (I) is independently a $(C_1-C_{50})$hydrocarbyl.

DETAILED DESCRIPTION

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed below:

$R^C$, $R^Z$, $R^1$, $R^2$, $R^3$, $R^4$, $Z_1$, $Z_2$, $Z_3$, X, Y, Q, and W: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); THF: tetrahydrofuran; $Et_2O$: diethyl ether; $CH_2Cl_2$: dichloromethane; EtOAc: ethyl acetate; $C_6D_6$: deuterated benzene or benzene-d6: $CDCl_3$: deuterated chloroform; $Na_2SO_4$: sodium sulfate; $MgSO_4$: magnesium sulfate; HCl: hydrogen chloride; n-BuLi: butyllithium; t-BuLi: tert-butyllithium; $K_2CO_3$: potassium carbonate; $N_2$: nitrogen gas; PhMe: toluene; PPR: parallel pressure reactor; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; Rr: retention fraction; TLC; thin-layer chromatography; rpm: revolutions per minute.

The term "independently selected" followed by multiple options is used herein to indicate that individual groups appearing before the term, such as $R^1$, $R^2$, $R^3$, $R^4$, and $R^C$, can be identical or different, without dependency on the identity of any other group also appearing before the term.

The term "procatalyst" refers to a compound that has catalytic activity after activation.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{50})$alkyl is an alkyl group having from 1 to 50 carbon atoms in its unsubstituted form. In some embodiments and general structures, certain chemical groups may be substituted by one or more substituents such as $R^S$ wherein $R^S$ generically represents any substituent defined in this application. An $R^S$ substituted version of a chemical group defined using the "$(C_x-C_y)$" parenthetical may contain more than y carbon atoms depending on the identity of any groups $R^S$. For example, a "$(C_1-C_{50})$alkyl substituted with exactly one group $R^S$, where $R^S$ is phenyl ($—C_6H_5$)" may contain from 7 to 56 carbon atoms. Thus, in general when a chemical group defined using the "$(C_x-C_y)$" parenthetical is substituted by one or more carbon atom-containing substituents $R^S$, the minimum and maximum total numbers of carbon atoms of the chemical group are determined by adding to both x and y, respectively, the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g., $R^S$). The prefix "per" has its usual meaning of "thoroughly" or "utterly", for example, the term "persubstitution" or "persubstituted", means that every hydrogen atom (H) bonded to a carbon atom or heteroatom of a corresponding unsubstituted compound or functional group is replaced by a substituent (e.g., $R^S$), as in "perfluorinated alkyl" means every hydrogen in an alkyl group is replaced by a fluorine atom. The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "$(C_1-C_{50})$hydrocarbyl" means a hydrocarbon radical of from 1 to 50 carbon atoms and the term "$(C_1-C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1-C_{50})$hydrocarbyl may be an unsubstituted or substituted $(C_1-C_{50})$alkyl, $(C_3-C_{50})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl ($—CH_2—C_6H_5$)).

The terms "$(C_1-C_{50})$alkyl" and "$(C_1-C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 2,2-dimethylpropyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, 2,2-dimethylpropyl; or 1,1-dimethylethyl.

The term "$(C_6-C_{50})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrenyl. Examples of substituted $(C_6-C_{40})$aryl include: substituted $(C_1-C_{20})$aryl; substituted $(C_6-C_{18})$aryl; 2,4-bis($[C_{20}]$alkyl)-phenyl; 3,5-bis($[C_{20}]$alkyl)-phenyl; polyfluorophenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{50})$hydrocarbylene include unsubstituted or substituted $(C_6-C_{50})$arylene, $(C_3-C_{50})$cycloalkylene, and $(C_1-C_{50})$alkylene (e.g., $(C_1-C_{20})$alkylene). The diradicals may be on the same carbon atom (e.g., —CH$_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1.4-, or an α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (i.e., —CH$_2$CH$_2$—), propan-1,3-diyl (i.e., —CH$_2$CH$_2$CH$_2$—), 2-methylpropan-1,3-diyl (i.e., —CH$_2$CH(CH$_3$)CH$_2$—). Some examples of $(C_6-C_{50})$ arylene α,ω-diradicals include phenyl-1,4-diyl, napthalen-2,6-diyl, or napthalen-3,7-diyl.

The term "$(C_1-C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1-C_{50})$alkylene are unsubstituted $(C_1-C_{20})$alkylene, including unsubstituted —CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)(CH$_3$), in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —CF$_2$—, —C(O)—, and —(CH$_2$)$_{14}$C(CH$_3$)$_2$(CH$_2$)$_5$— (i.e., a 6,6-dimethyl substituted 1,20-eicosylene). Since as mentioned previously two $R^S$ may be taken together to form a $(C_1-C_{18})$alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo[2.2.2]octane.

The term "$(C_3-C_{50})$cycloalkylene" means a cyclic diradical (i.e., the radicals are on ring atoms) of from 3 to 50 carbon atoms that is unsubstituted or substituted by one or more $R^S$.

The term "heteroatom," refers to an atom other than hydrogen or carbon. Examples of groups containing one or more than one heteroatom include —O—, —S—, —S(O)—, —S(O)$_2$—, —Si($R^C$)$_2$—, —P($R^P$)—, —P($R^P$)$_2$, —N($R^N$)—, —N($R^N$)$_2$—N=C($R^C$)$_2$, —N=C(NR$_2^C$)($R^C$), —Ge($R^C$)$_2$—, or —Si($R^C$)$_3$, where each $R^C$ and each $R^P$ is unsubstituted $(C_1-C_{18})$hydrocarbyl or —H, and where each $R^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1-C_{50})$heterohydrocarbyl may be unsubstituted or substituted. Non-limiting examples of the $(C_1-C_{50})$heterohydrocarbyl include $(C_1-C_{50})$heteroalkyl, $(C_1-C_{50})$hydrocarbyl-O—, $(C_1-C_{50})$hydrocarbyl-S—, $(C_1-C_{50})$hydrocarbyl-S(O)—, $(C_1-C_{50})$hydrocarbyl-S(O)$_2$—, $(C_1-C_{50})$hydrocarbyl-Si($R^C$)$_2$—, $(C_1-C_{50})$hydrocarbyl-N($R^N$)—, $(C_1-C_{50})$hydrocarbyl-P($R^P$)—, $(C_2-C_{50})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene. Additional examples include, but are not limited to —Si($R^C$)$_{3-Q}$(OR$^C$)$_Q$, —OSi($R^C$)$_{3-Q}$(OR$^C$)$_Q$, —Ge($R^C$)$_{3-Q}$(OR$^C$)$_Q$, —P($R^C$)$_{2-W}$(OR$^C$)$_W$, —P(O)($R^C$)$_{2-W}$(OR$^C$)$_W$, —N($R^C$)$_2$, —NH($R^C$)$_2$, —OR$^C$, —SR$^C$, —NO$_2$, —CN, —CF$_3$, —OCF$_3$, —S(O)R$^C$, —S(O)$_2$R$^C$, —OS(O)$_2$R$^C$, —N=C($R^C$)$_2$, —N=P($R^C$)$_3$, —OC(O)R$^C$, —C(O)OR$^C$, —N($R^C$)C(O)R$^C$, and —C(O)N($R^C$)$_2$.

The term "$(C_4-C_{50})$heteroaryl" means an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring has 5 minus h carbon atoms, wherein h is the number of heteroatoms and may be 1, 2, 3, or 4; and each heteroatom may be O, S, N. or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1, 2 or 3 and the heteroatoms may be N or P. Examples of 6-membered ring heteroaromatic hydrocarbon radicals include pyridine-2-yl; pyrimidin-2-yl; pyrazin-2-yl; 1,3,5-triazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazol-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f] indol-1-yl. An example of the fused 6,5,6-ring system is 9H-carbazol-9-yl. An example of the fused 6,6,6-ring system is acrydin-9-yl.

The term "$(C_1-C_{50})$heteroalkyl" means a saturated straight or branched chain radicals containing one to fifty carbon atoms, or fewer carbon atoms and one or more of the heteroatoms. The term "$(C_1-C_{50})$heteroalkylene" means a saturated straight or branched chain diradical containing from 1 to 50 carbon atoms and one or more than one heteroatom. The heteroatoms of the heteroalkyls or the heteroalkylenes may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means the anionic form of the halogen atom: fluoride ($F^-$), chloride ($C^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorus, nitrogen-nitrogen, nitrogen-phosphorus, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, or (in heteroatom-containing groups) one or more carbon-nitrogen, carbon-phosphorus, nitrogen-nitrogen, nitrogen-phosphorus, or carbon-silicon double bonds, not including double bonds that may be present in substituents $R^S$, if any, or in (hetero) aromatic rings, if any.

In one or more embodiments, the catalyst system includes a metal-ligand complex according to formula (I):

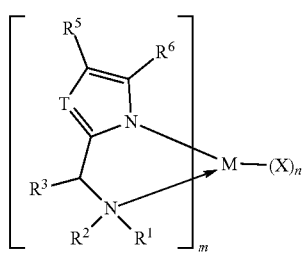

(I)

In formula (I), M is a metal chosen from titanium, zirconium, or hafnium, the metal having a formal oxidation state of +2, +3, or +4. Each X is a monodentate or bidentate ligand independently chosen from unsaturated $(C_2-C_{50})$hydrocarbon, unsaturated $(C_2-C_{50})$heterohydrocarbon, $(C_1-C_{50})$hydrocarbyl, $(C_1-C_{50})$heterohydrocarbyl, $(C_6-C_{50})$aryl, $(C_4-C_{50})$heteroaryl, cyclopentadienyl, substituted cyclopentadienyl, $(C_4-C_{12})$diene, halogen, $-N(R^N)_2$, and $-NCOR^C$; subscript n is 1, 2, or 3; and subscript m is 1 or 2. The metal-ligand complex has 6 or fewer metal-ligand bonds.

In formula (I), each T is nitrogen or $CR^4$, in which each $R^4$ is independently chosen from $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, halogen, or $-H$. Each $R^1$ is independently selected from the group consisting of an aliphatic $(C_1-C_{50})$hydrocarbyl, an aliphatic $(C_1-C_{50})$heterohydrocarbyl, -halogen, and $-H$, and, when m is 2, two $R^1$ are optionally covalently linked. Each $R^2$ is independently chosen from $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, and $-Ge(R^C)_3$, and $R^1$ and $R^2$ are optionally covalently connected to form a ring structure.

In formula (I), each $R^3$ and each $R^5$ is independently chosen from $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R)-$, $(R^C)_2NC(O)-$, halogen, or $-H$. Each $R^6$ is independently chosen from $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R)-$, $(R^C)_2NC(O)-$, or halogen; $R^5$ and $R^6$ are optionally covalently connected to form a ring structure; and each $R^C$ and $R^N$ in formula (I) is independently a $(C_1-C_{50})$hydrocarbyl.

In some embodiments, M is zirconium or hafnium; each X is independently chosen from $(C_6-C_{20})$aryl, $(C_4-C_{20})$heteroaryl, $(C_4-C_{12})$diene, or a halogen; and each $R^6$ is independently chosen from $(C_6-C_{50})$aryl or $(C_4-C_{50})$heteroaryl.

In one or more embodiments, each $R^6$ is phenyl or a substituted phenyl. In some embodiments, each $R^6$ is a substituted phenyl chosen from 2,4,6-trimethylphenyl; 2,6-di(iso-propyl)phenyl; 3,5-di-tert-butylphenyl, or 3,5-diphenylphenyl. Each $R^6$ is anthracenyl, di-substituted anthracenyl, or tri-substituted anthracenyl.

In some embodiments, $R^5$ and $R^6$ are covalently connected to form a six-member aromatic ring. In various embodiments, $R^5$ and $R^6$ are covalently connected to form a six-member aromatic ring; $R^3$ is $-H$; and $R^2$ is methyl.

In one or more embodiments, subscript m of formula (I) is 2, and the metal-ligand complex has a structure according to formula (II):

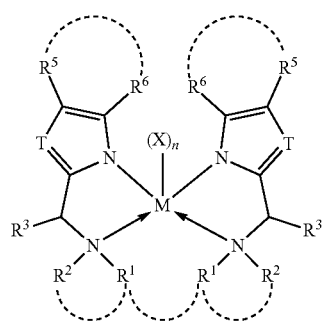

(II)

In formula (II), M, T, $R^1$, $R^2$, $R^3$, $R^4$, $R^5$, $R^6$, and X are as defined in formula (I); n is 1 or 2; and the dotted lines indicate optional covalent connections. All compounds according to formula (II) are also compounds according to formula (I). Thus, except where stated otherwise, it should be understood that a general reference herein to metal-ligand complexes having formula (I) includes, but is not necessarily limited to, all metal-ligand complexes having formula (II).

In some embodiments of catalyst system, the metal-ligand complex of formula (II), M is zirconium or hafnium; each X is independently chosen from $(C_6-C_{50})$aryl, $(C_4-C_{50})$heteroaryl, $(C_4-C_{12})$diene, or halogen; each $R^1$ and $R^2$ is independently chosen from $(C_1-C_{50})$hydrocarbyl, $(C_1-C_{50})$heterohydrocarbyl, $(C_6-C_{50})$aryl, $(C_4-C_{50})$heteroaryl, or halogen.

In some embodiments of catalyst system, the metal-ligand complex of formula (II), both $R^1$ are covalently connected; and each $R^2$ is independently $(C_1-C_{10})$alkyl. In one or more embodiments of catalyst system, the metal-ligand complex of formula (II), both $R^1$ are covalently connected as an alkylene chosen from —$CH_2CH_2$—, —$CH_2CH_2CH_2$—, or —$CH_2CH_2CH_2CH_2$—.

In some embodiments of catalyst system, m is 2 and the metal-ligand complex has a structure according to formula (III):

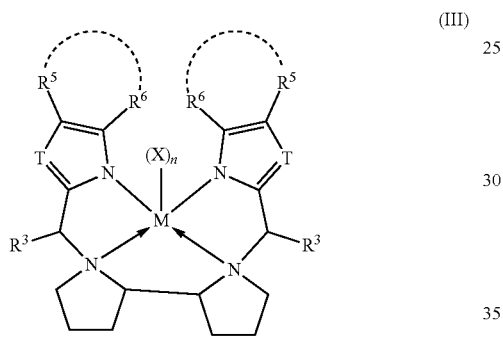

In formula (III), M, T, $R^3$, $R^4$, $R^5$, $R^6$, and X are as defined in formula (I); subscript n is 1 or 2; and each dotted line indicates an optional covalent connection. All compounds according to formula (III) are also compounds according to formula (I). Thus, except where stated otherwise, it should be understood that a general reference herein to metal-ligand complexes having formula (I) includes, but is not necessarily limited to, all metal-ligand complexes having formula (III).

In one or more embodiments, the catalyst system, in formula (III), each $R^6$ is independently chosen from di-[$(C_1-C_4)$alkyl]phenyl or a tri-[$(C_1-C_4)$alkyl]phenyl.

In some embodiments of the catalyst system, in formula (III), each $R^6$ is independently chosen from carbazolyl, 3,5-di-tert-butylphenyl; 2,4,6-trimethylphenyl; 2,6-di-isopropylphenyl; or 3,5-di-iso-propylphenyl.

In some embodiments of the catalyst system, in formulas (I), (II), and (III), T is N. In other embodiments, T is $CR^4$, in which $R^4$ is independently chosen from $(C_1-C_{50})$hydrocarbyl, $(C_1-C_{50})$heterohydrocarbyl, $(C_6-C_{50})$aryl, $(C_4-C_{50})$heteroaryl, —$Si(R^C)_3$, —$Ge(R^C)_3$, —$P(R^P)_2$, —$N(R^N)_2$, —$OR^C$, —$SR^C$, —$NO_2$, —$CN$, —$CF_3$, halogen, or —H. In some embodiments, each $R^4$ is hydrogen; in other embodiments, $R^4$ is $(C_1-C_{20})$alkyl.

One or more embodiments of this disclosure includes polymerization processes for producing an ethylene-based polymer. The polymerization process includes polymerizing ethylene and at least one additional α-olefin in the presence of a catalyst system according to this disclosure and at least one activator to form a polymer.

In illustrative embodiments, the catalyst systems may include a metal-ligand complex according to any of formulas (I), (II), or (III) having the structure of any of Procatalysts 1-7

Procatalyst 1

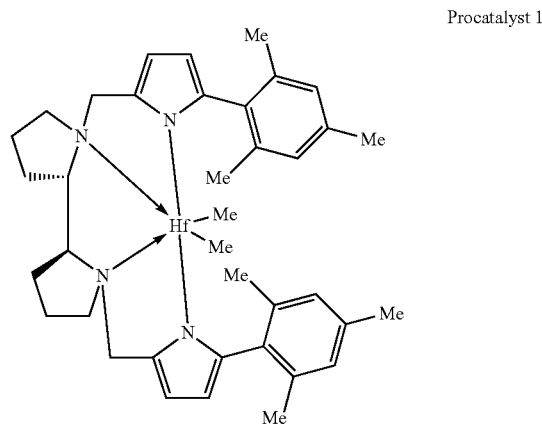

Procatalyst 2

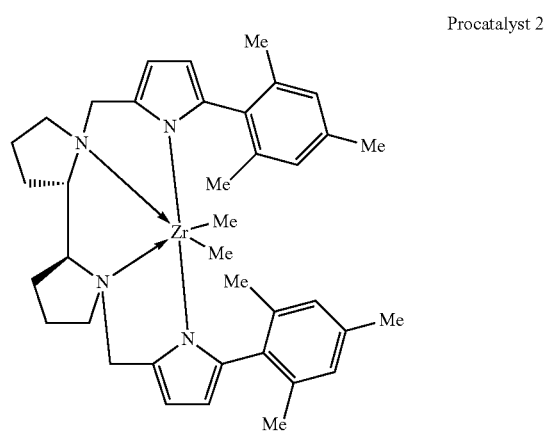

Procatalyst 3

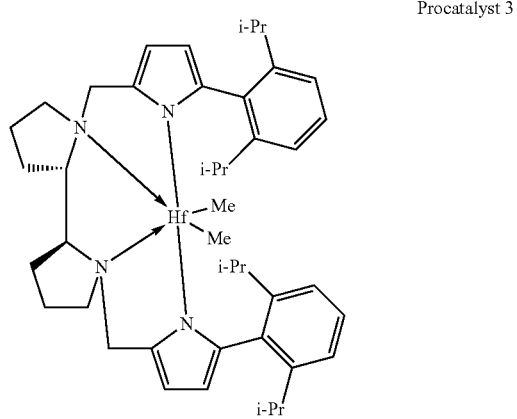

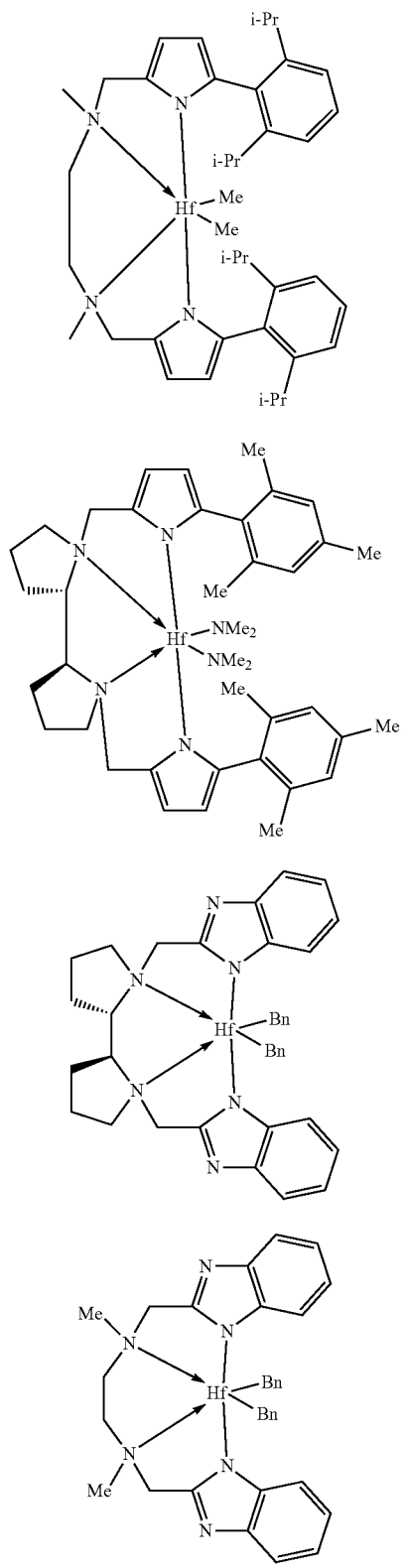
In illustrative embodiments, the metal-ligand complex according to any of formulas (I), (II), or (III) having the structure of any of Procatalysts 1–7 may be formed from Ligands 1 to 12.

Ligand 6

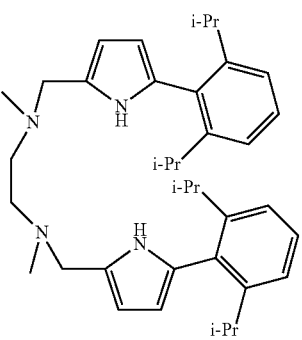

Ligand 7

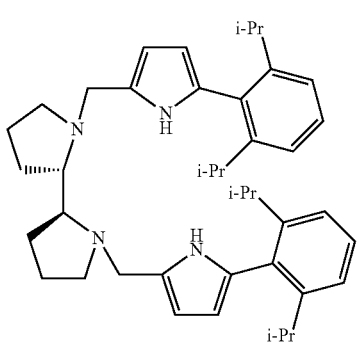

Ligand 8

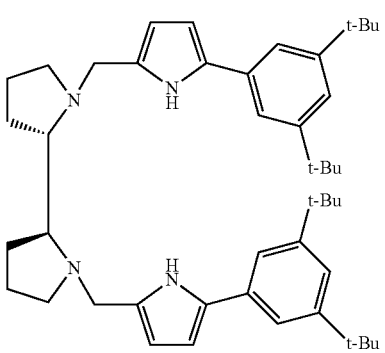

Ligand 9

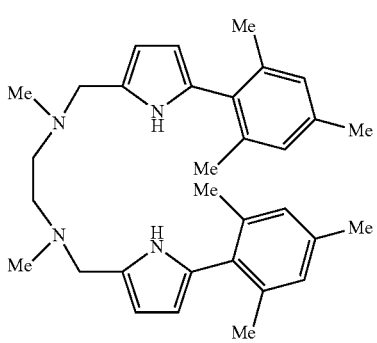

Ligand 10

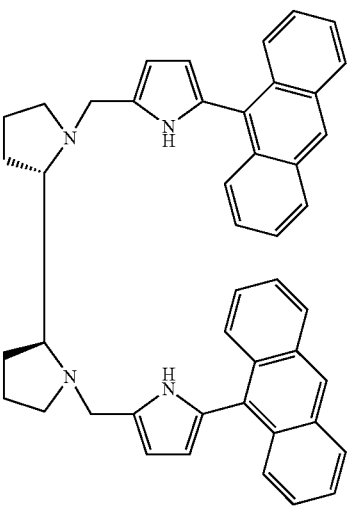

Ligand 11

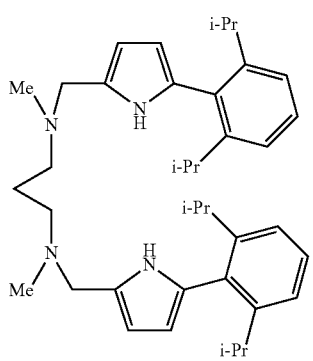

Ligand 12

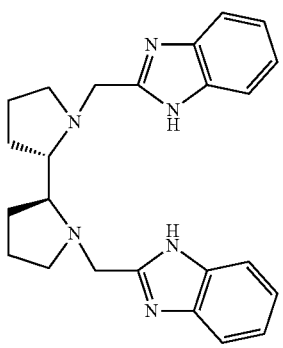

Cocatalyst Component

The catalyst system comprising a metal-ligand complex of formula (I) may be rendered catalytically active by any technique known in the art for activating metal-based catalysts of olefin polymerization reactions. For example, the procatalyst according to a metal-ligand complex of formula (I) may be rendered catalytically active by contacting the complex to an activating co-catalyst or combining the complex with an activating co-catalyst. Additionally, the metal-ligand complex according for formula (I) includes both a neutral procatalyst form, and a positively-charged catalytic form, which may be positively charged due to the loss of a monoanionic ligand, such as a benzyl or phenyl. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activating co-catalysts include Group 13 metal compounds containing $(C_1-C_{20})$hydrocarbyl substituents as described herein. In some embodiments. Group 13 metal compounds are tri$((C_1-C_{20})$hydrocarbyl)-substituted-aluminum or tri$((C_1-C_{20})$hydrocarbyl)-boron compounds. In other embodiments. Group 13 metal compounds are tri(hydrocarbyl)-substituted-aluminum, tri$((C_1-C_{20})$hydrocarbyl)-boron compounds, tri$((C_1-C_{10})$alkyl)aluminum, tri$((C_6-C_{18})$aryl) boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tri$((C_1-C_{20})$hydrocarbyl)ammonium tetra$((C_1-C_{20})$hydrocarbyl)borate (e.g. bis(octadecyl)methylammonium tetrakis(pentafluorophenyl)borate). As used herein, the term "ammonium" means a nitrogen cation that is a $((C_1-C_{20})$hydrocarbyl$)_4N^+$ a $((C_1-C_{20})$hydrocarbyl$)_3N(H)^+$, a $((C_1-C_{20})$hydrocarbyl$)_2N(H)_2^+$, $(C_1-C_{20})$hydrocarbylN(H)$_3^+$, or $N(H)_4^+$, wherein each $(C_1-C_{20})$hydrocarbyl, when two or more are present, may be the same or different.

Combinations of neutral Lewis acid activating co-catalysts include mixtures comprising a combination of a tri $((C_1-C_4)$alkyl)aluminum and a halogenated tri$((C_6-C_{18})$aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex): (tris(pentafluoro-phenylborane): (alumoxane) [e.g., (Group 4 metal-ligand complex):(tris (pentafluoro-phenylborane):(alumoxane)] are from 1:1:1 to 1:10:5000, in other embodiments, from 1:1:1.5 to 1:5:10.

The catalyst system that includes the metal-ligand complex of formula (I) may be activated to form an active catalyst composition by combination with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl ammonium tetrakis(pentafluorophenyl)borate(1-), and combinations thereof.

In some embodiments, more than one of the foregoing activating co-catalysts may be used in combination with each other. A specific example of a co-catalyst combination is a mixture of a tri$((C_1-C_4)$hydrocarbyl)aluminum, tri$((C_1-C_4)$hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10.000 to 100:1. In some embodiments, the ratio is at least 1:5000, in some other embodiments, at least 1:1000; and 10:1 or less, and in some other embodiments. 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl) borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Polyolefins

The catalytic systems according to embodiments are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene based polymers, for example homopolymers and/or interpolymers (including copolymers) of ethylene and optionally one or more co-monomers such as α-olefins, may comprise from at least 50 percent by weight monomer units derived from ethylene. All individual values and subranges encompassed by "from at least 50 weight percent" are disclosed herein as separate embodiments; for example, the ethylene based polymers, homopolymers and/or interpolymers (including copolymers) of ethylene and optionally one or more co-monomers such as α-olefins may comprise at least 60 weight percent monomer units derived from ethylene; at least 70 weight percent monomer units derived from ethylene; at least 80 weight percent monomer units derived from ethylene; or from 50 to 100 weight percent monomer units derived from ethylene; or from 80 to 100 weight percent units derived from ethylene.

In some embodiments, the ethylene based polymers may comprise at least 90 mole percent units derived from ethylene. All individual values and subranges from at least 90 mole percent are included herein and disclosed herein as separate embodiments. For example, the ethylene based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene based polymer, the amount of additional α-olefin is less than 50%; other embodiments include at least 1 mole percent (mol %) to 25 mol %; and in further embodiments the amount of additional α-olefin includes at least 5 mol % to 100 mol %. In some embodiments, the additional α-olefin is 1-octene.

Any conventional polymerization processes may be employed to produce the ethylene based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene based polymer may be produced via solution polymerization in a single reactor system, for example a single loop reactor system, in which ethylene and optionally one or more α-olefins are polymerized in the presence of the catalyst system, as described within this disclosure, and optionally one or more cocatalysts, as described in the preceding paragraphs.

The ethylene based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene based polymers may contain any amounts of additives. The ethylene based polymers may compromise from about 0 to about 10 percent by the combined weight of such additives, based on the weight of the ethylene based polymers and the one or more additives. The ethylene based polymers may further comprise fillers, which may include, but are not limited to, organic or inorganic fillers. The ethylene based polymers may contain from about 0 to about 20 weight percent fillers such as, for example, calcium carbonate, talc, or $Mg(OH)_2$, based on the combined weight of the ethylene based polymers and all additives or fillers. The ethylene based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex of formula (I), (II), or (III). The polymer resulting from such a catalyst system that incorporates the metal-ligand complex of formula (I), (II), or (III) may have a density according to ASTM D792 (incorporated herein by reference in its entirety) from 0.850 g/cm$^3$ to 0.950 g/cm$^3$, from 0.880 g/cm$^3$ to 0.920 g/cm$^3$, from 0.880 g/cm$^3$ to 0.910 g/cm$^3$, or from 0.880 g/cm$^3$ to 0.900 g/cm$^3$, for example.

In another embodiment, the polymer resulting from the catalyst system that includes the metal-ligand complex of any of formulas (I), (II), or (III) has a melt flow ratio ($I_{10}/I_2$) from 5 to 15, in which melt index I2 is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex of any of formulas (I), (II), or (III) has a molecular-weight distribution (MWD) from 1 to 40, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Embodiments of the catalyst systems described in this disclosure yield unique polymer properties as a result of the high molecular weights of the polymers formed and the amount of the co-monomers incorporated into the polymers.

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Varian 400-MR and VNMRS-500 spectrometers. LC-MS analyses are performed using a Waters e2695 Separations Module coupled with a Waters 2424 ELS detector, a Waters 2998 PDA detector, and a Waters 3100 ESI mass detector. LC-MS separations are performed on an XBridge C18 3.5 μm 2.1×50 mm column using a 5:95 to 100:0 acetonitrile to water gradient with 0.1% formic acid as the ionizing agent. HRMS analyses are performed using an Agilent 1290 Infinity LC with a Zorbax Eclipse Plus C18 1.8 μm 2.1×50 mm column coupled with an Agilent 6230 TOF Mass Spectrometer with electrospray ionization. $^1$H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1$H NMR data are reported in ppm downfield from internal tetramethylsilane (TMS, δ scale) using residual protons in the deuterated solvent as references. $^{13}$C NMR data are determined with $^1$H decoupling, and the chemical shifts are reported downfield from tetramethylsilane (TMS, δ scale) in ppm versus the using residual carbons in the deuterated solvent as references.

General Procedure for PPR Screening Experiments

Polyolefin catalysis screening is performed in a high throughput parallel polymerization reactor (PPR) system. The PPR system is composed of an array of 48 single-cell (6×8 matrix) reactors in an inert-atmosphere glovebox. Each cell is equipped with a glass insert with an internal working liquid volume of approximately 5 mL. Each cell has independent controls for pressure, and the liquid in the cell is continuously stirred at 800 rpm. Catalyst solutions, unless otherwise noted, are prepared by dissolving an appropriate amount of a procatalyst in toluene. All liquids (for example, solvent, 1-octene, scavenger solutions as appropriate to the experiment, and catalyst solutions) are added to the single-cell reactors via robotic syringes. Gaseous reagents (i.e. ethylene, H$_2$) are added to the single-cell reactors via a gas injection port. Prior to each run, the reactors are heated to 80° C., purged with ethylene, and vented.

A portion of Isopar-E is added to the reactors. The reactors are heated to the run temperature and pressured to the appropriate psig with ethylene. Toluene solutions of reagents are added in the following order: (1) 1-octene with 500 nmol of scavenger MMAO-3A; (2) activator (cocatalyst-1, cocatalyst-2, etc); and (3) catalyst.

Each liquid addition is chased with a small amount of Isopar-E so that after the final addition, a total reaction volume of 5 mL is reached. Upon addition of the catalyst, the PPR software begins monitoring the pressure of each cell. The pressure (within approximately 2-6 psig) is maintained by the supplemental addition of ethylene gas by opening the valve at the set point minus 1 psi and closing it when the pressure reached 2 psi higher. All drops in pressure are cumulatively recorded as "Uptake" or "Conversion" of the ethylene for the duration of the run or until the uptake or conversion requested value is reached, whichever occurs first. Each reaction is quenched with the addition of 10% carbon monoxide in argon for 4 minutes at 40-50 psi higher than the reactor pressure. A shorter "Quench Time" means that the catalyst is more active. In order to prevent the formation of too much polymer in any given cell, the reaction is quenched upon reaching a predetermined uptake level (50 psig for 120° C. runs, 75 psig for 150° C. runs). After all the reactions are quenched, the reactors are allowed to cool to 70° C. The reactors are vented, purged for 5 minutes with nitrogen to remove carbon monoxide, and the tubes are removed. The polymer samples are dried in a centrifugal evaporator at 70° C. for 12 hours, weighed to determine polymer yield, and submitted for IR (1-octene incorporation) and GPC (molecular weight) analysis.

SymRAD HT-GPC Analysis

The molecular weight data is determined by analysis on a hybrid Symyx/Dow built Robot-Assisted Dilution High-Temperature Gel Permeation Chromatographer (Sym-RAD-GPC). The polymer samples are dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was diluted to 1 mg/mL immediately before the injection of a 250 μL aliquot of the sample. The GPC is equipped with two Polymer Labs PLgel 10 μm MIXED-B columns (300×10 mm) at a flow rate of 2.0 mL/minute at 160° C. Sample detection is performed using a PolyChar IR4 detector in concentration mode. A conventional calibration of narrow polystyrene (PS) standards is utilized with apparent units adjusted to homo-polyethylene (PE) using known Mark-Houwink coefficients for PS and PE in TCB at this temperature.

1-Octene Incorporation IR Analysis

The running of samples for the HT-GPC analysis precedes the IR analysis. For the IR anylsis, a 48-well HT silicon wafer is utilized for deposition and analysis of 1-octene incorporation of samples. For the analysis, the samples are heated to 160° C. for less than or equal to 210 minutes; the samples are reheated to remove magnetic GPC stir bars and are shaken with glass-rod stir bars on a J-KEM Scientific heated robotic shaker. Samples are deposited while being heated using a Tecan MiniPrep 75 deposition station, and the 1,2,4-trichlorobenzene is evaporated off the deposited wells of the wafer at 160° C. under nitrogen purge. The analysis of 1-octene is performed on the HT silicon wafer using a NEXUS 670 E.S.P. FT-IR.

Batch Reactor Polymerization Procedure

The batch reactor polymerization reactions are conducted in a 2 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve that empties the reactor contents into a stainless steel dump pot. The dump pot is prefilled with a catalyst kill solution (typically 5 mL of an Irgafos/Irganox/toluene mixture). The dump pot is vented to a 30 gallon blow-down tank, with both the pot and the tank purged with nitrogen. All solvents used for polymerization or catalyst makeup are run through solvent purification columns to remove any impurities that may affect polymerization. The 1-octene and IsoparE are passed through two columns, the first containing A2 alumina, the second containing Q5. The ethylene is passed through two columns, the first containing A204 alumina and 4Å molecular sieves, the second containing Q5 reactant. The $N_2$, used for transfers, is passed through a single column containing A204 alumina, 4Å molecular sieves and Q5.

The reactor is loaded first from the shot tank that may contain Isopar-E solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when the ethylene is at the reaction temperature to maintain reaction pressure set point. The amount of ethylene added is monitored by a micro-motion flow meter. For some experiments, the standard conditions at 120° C. are 46 g ethylene and 303 g 1-octene in 611 g of Isopar-E, and the standard conditions at 150° C. are 43 g ethylene and 303 g 1-octene in 547 g of Isopar-E.

The procatalyst and activators are mixed with the appropriate amount of purified toluene to achieve a molarity solution. The procatalyst and activators are handled in an inert glove box, drawn into a syringe and pressure transferred into the catalyst shot tank. The syringe is rinsed three times with 5 mL of toluene. Immediately after the catalyst is added, the run timer begins. If ethylene is used, it is added by the Camile to maintain reaction pressure set point in the reactor. The polymerization reactions are run for 10 minutes, then the agitator is stopped, and the bottom dump valve is opened to empty reactor contents to the dump pot. The contents of the dump pot are poured into trays and placed in a lab hood where the solvent was evaporated off overnight. The trays containing the remaining polymer are transferred to a vacuum oven, where they are heated up to 140° C. under vacuum to remove any remaining solvent. After the trays cool to ambient temperature, the polymers were weighed for yield to measure efficiencies, and submitted for polymer testing.

EXAMPLES

Examples 1 to 40 are synthetic procedures for intermediates of the ligands, the ligands themselves, and the isolated procatalysts. Procatalysts 1 to 7 were synthesized from Ligands 1 to 7. Examples 41 to 42 are include the results from polymerization reactions in the batch reactor and the parallel pressure reactor. One or more features of the present disclosure are illustrated in view of the examples as follows:

Example 1: Synthesis of tert-butyl 2-phenyl-1H-pyrrole-1-carboxylate (3)

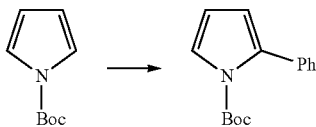 [SMILES: CC(C)(C)OC(=O)n1cccc1 ; CC(C)(C)OC(=O)n1cccc1-c1ccccc1]

A 250 mL round bottom flask was charged with N-Boc-pyrrole 2-boronic acid (5.00 g, 23.7 mmol, 1.1 equiv.) and XPhos palladacycle mesylate precatalyst (0.137 g, 0.162 mmol, 0.75 mol %). The vessel was sealed with a septum and subsequently evacuated and backfilled with nitrogen three times. Chlorobenzene (2.2 mL, 21.5 mmol, 1 equiv.), THF (44 mL), and a degassed 0.5 M solution of $K_3PO_4$ (86 mL, 43 mmol, 2 equiv.) were sequentially added via syringe, and the reaction was stirred at room temperature for 3 h. The reaction was extracted with diethyl ether (2×50 mL). The combined organic layers were dried over $MgSO_4$, filtered, and concentrated in vacuo. The material was adsorbed onto silica gel and purified by flash column chromatography (ISCO, 220 g silica gel, 1-3% EtOAc in hexanes) yielding the product as a pale yellow oil (4.80 g, 92% yield).

$^1$H NMR (400 MHz, Chloroform-d) δ 7.40-7.27 (m, 6H), 6.25-6.22 (m, 1H), 6.21-6.18 (m, 1H), 1.35 (s, 9H). $^{13}$C NMR (101 MHz, Chloroform-d) δ 149.37, 135.00, 134.45, 129.18, 127.53, 127.12, 122.49, 114.34, 110.52, 83.49, 27.58.

Example 2: Synthesis of 2-phenyl-1H-pyrrole (4)

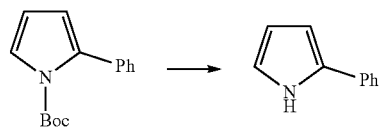 [SMILES: CC(C)(C)OC(=O)n1cccc1-c1ccccc1 ; c1ccc(-c2ccc[nH]2)cc1]

In a nitrogen-filled glovebox, sodium methoxide (2.86 g, 53.0 mmol, 3 equiv.) was added to a solution of tert-butyl 2-phenyl-1H-pyrrole-1-carboxylate (3) (4.30 g, 17.7 mmol, 1 equiv.) in THF (50 mL). The solution immediately turned dark brown. The vessel was capped with a septum and removed from the glove box. Anhydrous methanol (14 mL) was added via syringe, and the reaction was stirred at room temperature for 18 h. The solution was concentrated to a volume of approximately 5 mL in vacuo. Water (100 mL) was added, and the aqueous phase was extracted with diethyl ether (3×50 mL). The combined organic phases were dried over $MgSO_4$, filtered, and concentrated in vacuo to yield a brown solid. The solid was recrystallized from boiling hexanes (~130 mL) to yield a light brown solid (1.93 g, 76% yield).

$^1$H NMR (400 MHz, Chloroform-d) δ 8.39 (br s, 1H), 7.48 (d, J=8.2 Hz, 2H), 7.37 (t, J=7.6 Hz, 2H), 7.22 (t, J=7.8 Hz, 1H), 6.85 (s, 1H), 6.55 (s, 1H), 6.32 (d, J=3.0 Hz, 1H). $^{13}$C NMR (101 MHz, Chloroform-d) δ 132.75, 132.10, 128.89, 126.20, 123.84, 118.87, 110.11, 105.95.

Example 3: Synthesis of N,N-dimethyl-1-(5-phenyl-1H-pyrrol-2-yl)methanamine-Ligand 1

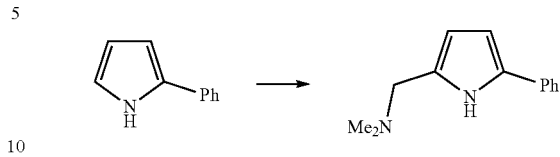

To a reaction vial was added dimethylamine hydrochloride (1.07 g, 13.1 mmol, 1 equiv.), 37% formaldehyde solution (1.03 mL, 13.7 mmol, 1.05 equiv.), and isopropanol (8 mL). The vial was capped, and the reaction was stirred at room temperature for 30 minutes. Subsequently, the solution was added via syringe to a vial under a nitrogen atmosphere containing 2-phenylpyrrole (4) (1.87 g, 3.50 mmol, 1 equiv.). The reaction was stirred at 40° C. for 24 h. A 10% aqueous solution of KOH (75 mL) was added, and the reaction was stirred for 2 h. The aqueous phase was extracted with dichloromethane (3×50 mL). The combined organic phases were dried over $MgSO_4$, filtered, and concentrated in vacuo to yield the product as a pink solid (2.54 g, 97% yield).

$^1$H NMR (500 MHz, Chloroform-d) δ 9.04 (br s, 1H), 7.48-7.44 (m, 2H), 7.34 (t, J=7.8 Hz, 2H), 7.19-7.15 (m, 1H), 6.43 (t, J=3.1 Hz, 1H), 6.10 (t, J=2.9 Hz, 1H), 3.47 (s, 2H), 2.27 (s, 6H). $^{13}$C NMR (126 MHz, Chloroform-d) δ 132.93, 132.00, 130.59, 128.74, 125.83, 123.65, 109.19, 105.46, 56.81, 45.23.

Example 4: Synthesis of tert-butyl 2-(3,5-di-tert-butylphenyl)-1H-pyrrole-1-carboxylate (7)

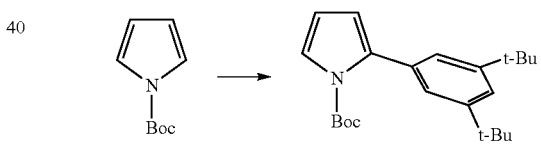

A 250 round bottom flask was charged with N-Boc-pyrrole 2-boronic acid (3.95 g, 18.7 mmol, 1.1 equiv.), 1-bromo-3,5-di-tert-butylbenzene (4.58 g, 17.0 mmol, 1 equiv.), and XPhos palladacycle mesylate precatalyst (288 mg, 0.340 mmol, 2 mol %). The vessel was sealed with a septum and subsequently evacuated and backfilled with nitrogen three times. THF (34 mL) and a degassed 0.5 M aqueous solution of $K_3PO_4$ (68 mL, 34.0 mmol, 2 equiv.) were sequentially added via syringe, and the reaction was stirred at room temperature for 8 h. The reaction was extracted with diethyl ether (2×60 mL). The combined organic layers were dried over $MgSO_4$, filtered, and concentrated in vacuo. Purification via ISCO (silica gel, 220 g, 0.5-1% EtOAc in hexanes) yielded the product as a white solid (4.95 g, 81% yield).

$^1$H NMR (400 MHz, Chloroform-d) δ 7.41-7.40 (m, 1H), 7.38-7.36 (m, 1H), 7.19-7.17 (m, 2H), 6.30-6.24 (m, 1H), 6.22-6.19 (m, 1H), 1.36 (s, 18H), 1.30 (s, 9H). $^{13}$C NMR (101 MHz, Chloroform-d) δ 149.70, 149.50, 135.95, 133.81, 123.52, 121.96, 121.34, 113.88, 110.38, 82.98, 34.82, 31.54, 27.48.

Example 5: Synthesis of 2-(3,5-di-tert-butylphenyl)-1H-pyrrole (8)

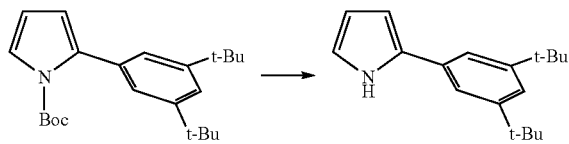 [SMILES: CC(C)(C)OC(=O)n1cccc1-c1cc(C(C)(C)C)cc(C(C)(C)C)c1 ; CC(C)(C)c1cc(-c2ccc[nH]2)cc(C(C)(C)C)c1]

In a nitrogen-filled glovebox, sodium methoxide (2.34 g, 43.3 mmol, 3 equiv.) was added to a solution of tert-butyl 2-(3,5-di-tert-butylphenyl)-1H-pyrrole-1-carboxylate (7) (5.13 g, 14.4 mmol, 1 equiv.) in THF (41 mL). The suspension was slightly yellow. The vessel was capped with a septum and removed from the glove box. Anhydrous methanol (12 mL) was added via syringe, and the reaction was stirred at room temperature for 18 h. Upon addition of methanol, all solids went into solution and the reaction turned slightly pink. After approximately 5 min, the solution turned hazy due to a small amount of precipitate formation. The solution was concentrated in vacuo. Water (100 mL) was added, and the aqueous phase was extracted with diethyl ether (3×50 mL). The combined organic phases were dried over MgSO$_4$, filtered, and concentrated in vacuo to yield an off-white solid (3.65 g, 99% yield).

$^1$H NMR (400 MHz, Chloroform-d) δ 8.44 (br s, 1H), 7.33 (s, 3H), 6.89-6.84 (m, 1H), 6.54-6.48 (m, 1H), 6.32 (q, J=2.9 Hz, 1H), 1.37 (s, 18H). $^{13}$C NMR (101 MHz, Chloroform-d) δ 151.23, 133.30, 132.20, 120.71, 118.74, 118.33, 109.88, 105.64, 34.90, 31.47.

Example 6: Synthesis of 1-(5-(3,5-di-tert-butylphenyl)-1H-pyrrol-2-yl)-N,N-dimethylmethanamine (9)

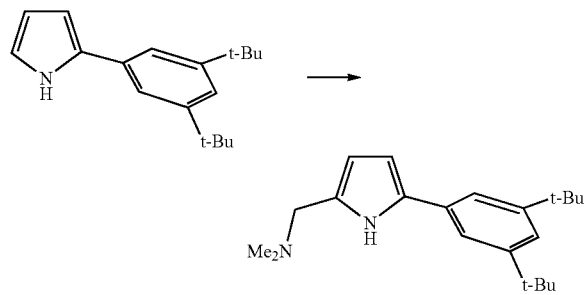

To a reaction vial was added dimethylamine hydrochloride (1.28 g, 15.7 mmol, 1 equiv.), 37% formaldehyde solution (1.24 mL, 16.4 mmol, 1.05 equiv.), and isopropanol (7 mL). The vial was capped, and the reaction was stirred at room temperature for 30 minutes. Subsequently, the solution was added via syringe to a vial under a nitrogen atmosphere containing 2-(3,5-di-tert-butylphenyl)-1H-pyrrole (8) (4.00 g, 13.3 mmol, 1 equiv.). The formaldehyde vial was rinsed with additional isopropanol (1 mL), and this was added to the pyrrole solution. The reaction was stirred at 40° C. for 72 h. A 10% aqueous solution of KOH (100 mL) was added, and the reaction was stirred for 1 h. The aqueous phase was extracted with dichloromethane (3×60 mL). The combined organic phases were dried over MgSO$_4$, filtered, and concentrated in vacuo to yield the product as a red oil (4.95 g, quantitative yield). The material was reluctant to solidify and still contained some solvent, resulting in a mass slightly higher than the theoretical yield. Several cycles of drying in vacuo, dissolving in hexane, and again drying in vacuo were necessary to remove residual isopropanol.

$^1$H NMR (400 MHz, Chloroform-d) δ 9.08 (br s, 1H), 7.45 (d, J=1.8 Hz, 2H), 7.40 (t, J=1.8 Hz, 1H), 6.51 (dd, J=3.4, 2.6 Hz, 1H), 6.19 (dd, J=3.4, 2.4 Hz, 1H), 3.56 (s, 2H), 2.33 (s, 6H), 1.47 (s, 18H). $^{13}$C NMR (101 MHz, Chloroform-d) δ 151.13, 133.48, 132.49, 129.95, 120.45, 118.62, 109.47, 105.39, 56.96, 45.20, 34.97, 31.62.

Example 7: Synthesis of 1-(5-(3,5-di-tert-butylphenyl)-1H-pyrrol-2-yl)-N,N,N-trimethylmethanaminium iodide (10)

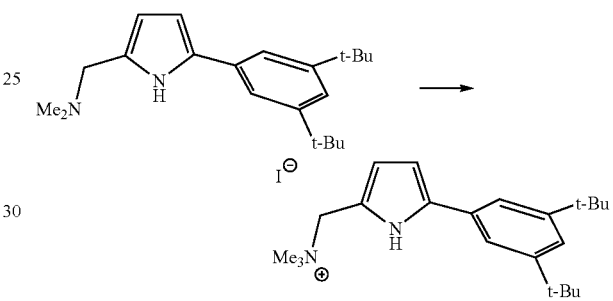

In a nitrogen-filled glovebox, a 500 mL round bottom flask was charged with 1-(5-(3,5-di-tert-butylphenyl)-1H-pyrrol-2-yl)-N,N-dimethylmethanamine (9) (4.89 g, 15.6 mmol, 1 equiv.) and dissolved in THF (85 mL). The flask was sealed with a septum and removed from the glove box. A solution of methyl iodide (0.97 mL, 15.6 mmol, 1 equiv.) in THF (8 mL) was added to the stirring pyrrole solution dropwise. The mixture was stirred at room temperature for 2.5 h, resulting in the precipitation of a fine white solid from the red solution. The suspension was filtered, however the precipitated solid was too fine and passed through the frit. Approximately 1 mL of the solution was concentrated in vacuo, yielding a purple solid. The solution was concentrated to one-third volume and stored in a −30° C. freezer for 3 days. Hexane (200 mL) was added, resulting in the precipitation of a purple solid. The suspension was cooled in a −30° C. freezer for 1 day. The solid was filtered, washed with cold (−30° C.) hexane, and dried in vacuo to yield a purple solid (4.45 g, 63% yield). The initial APT spectrum looked promising, so the sample was added into the night queue. However, by the time the spectrum was acquired, the material appeared to have decomposed. The material is not stable in chloroform for prolonged periods.

$^1$H NMR (400 MHz, Chloroform-d) δ 11.19 (s, 1H), 7.55 (s, 2H), 7.28 (s, 1H), 6.49-6.41 (m, 1H), 6.38-6.29 (m, 1H), 5.06 (s, 2H), 3.16 (s, 9H), 1.33 (s, 18H). $^{13}$C NMR (101 MHz, Chloroform-d) δ 151.42, 136.81, 130.71, 121.29, 119.25, 117.84, 115.54, 106.02, 62.09, 52.52, 35.05, 31.57.

Example 8: Synthesis of (2S,2'S)-1,1'-bis((5-(3,5-di-tert-butylphenyl)-1H-pyrrol-2-yl)methyl)-2,2'-bipyrrolidine (11)-Ligand 8

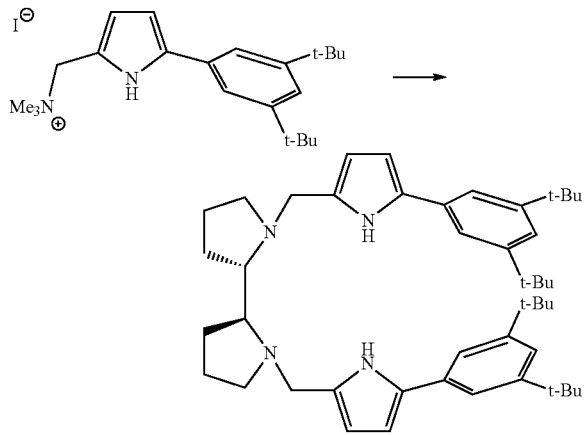

A reaction vial was charged with 1-(5-(3,5-di-tert-butylphenyl)-1H-pyrrol-2-yl)-N,N,N-trimethylmethanaminium iodide (10) (1.00 g, 2.20 mmol, 2 equiv.), (2S,2'S)-2,2'-bipyrrolidine (0.154 g, 1.10 mmol, 1 equiv.), and anhydrous K₂CO₃ (1.52 g, 11.0 mmol, 10 equiv.). The vial was capped and purged with nitrogen. Acetonitrile (9 mL) was added and the reaction was stirred at 72° C. for 19 h. The suspension was poured onto water (75 mL). The aqueous phase was extracted with dichloromethane (3×25 mL). The combined organic phases were dried over MgSO₄, filtered, and concentrated in vacuo. The material was adsorbed onto celite purified via reverse phase flash column chromatography (ISCO, RediSepRf Gold C-18 reverse phase). The first reverse phase column eluents were water:MeCN (20:80 to 0:100 gradient) followed by THF:water (100:0 to 80:20 gradient), however this did not afford clean material. A second purification using a MeCN:THF (100:0 to 0:100 gradient) allowed for a more efficient separation. The product was obtained as a red oil (0.172 g, 23% yield).

$^1$H NMR (400 MHz, Chloroform-d) δ 9.67 (s, 2H), 7.26-7.20 (m, 6H), 6.40-6.34 (m, 2H), 6.08-6.03 (m, 2H), 3.94 (d, J=14.2 Hz, 2H), 3.75 (d, J=14.2 Hz, 2H), 2.86 (dt, J=11.0, 6.1 Hz, 2H), 2.71-2.63 (m, 2H), 2.51-2.38 (m, 2H), 1.85 (dt, J=14.8, 7.1 Hz, 2H), 1.76-1.58 (m, 4H), 1.58-1.48 (m, 2H), 1.26 (s, 36H). $^{13}$C NMR (101 MHz, Chloroform-d) δ 151.00, 133.04, 132.65, 130.56, 120.21, 118.59, 108.40, 105.78, 66.43, 54.43, 52.43, 34.76, 31.37, 27.71, 23.29. HRMS (ESI) Calculated for C₄₆H₆₆N₄[M+H]⁺: 675.5360; found 675.5354.

Example 9: Synthesis of tert-butyl 2-mesityl-1H-pyrrole-1-carboxylate (12)

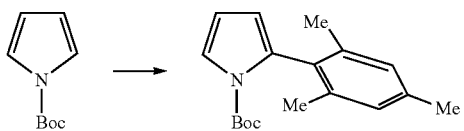 [SMILES: CC(C)(C)OC(=O)n1cccc1 ; Cc1cc(C)c(-c2cccn2C(=O)OC(C)(C)C)c(C)c1]

A 250 mL round bottom flask was charged with N-Boc-pyrrole 2-boronic acid (6.62 g, 31.4 mmol, 1.5 equiv.), anhydrous K₃PO₄ (8.88 g, 41.8 mmol, 2 equiv.), Pd(OAc)₂ (94 mg, 0.418 mmol, 2 mol %), and SPhos (0.343 g, 0.836 mmol, 4 mol %). The vessel was sealed with a septum, and subsequently evacuated and backfilled with nitrogen three times, 2-bromomesitylene (3.2 mL, 20.9 mmol, 1 equiv.) and anhydrous 1-butanol (42 mL) were added via syringe, and the reaction was stirred at 100° C. for 5 h. The black slurry was cooled to room temperature, and filtered through a short plug of silica gel which was eluted with EtOAc (approximately 75 mL), yielding a light yellow solution. All volatiles were removed in vacuo. The remaining oil was adsorbed onto silica gel and purified via flash column chromatography (ISCO, 330 g silica gel, 1-4% EtOAc in hexanes eluent) to yield a mixture of a clear oil and white solid material (4.96 g). The $^1$H NMR spectum showed the material is 84% pure, containing some N-Boc-pyrrole, presumably from protodeboronation. Actual yield of product is 4.42 g, 74% yield.

$^1$H NMR (400 MHz, Chloroform-d) δ 7.38 (dd, J=3.4, 1.8 Hz, 1H), 6.86 (s, 2H), 6.26 (t, J=3.3 Hz, 1H), 5.98 (dd, J=3.2, 1.8 Hz, 1H), 2.29 (s, 3H), 2.01 (s, 6H), 1.21 (s, 9H). $^{13}$C NMR (101 MHz, Chloroform-d) δ 149.38, 137.84, 137.14, 131.92, 131.83, 127.43, 120.81, 113.16, 110.65, 82.72, 27.37, 21.09, 20.18.

Example 10: Synthesis of 2-mesityl-1H-pyrrole (13)

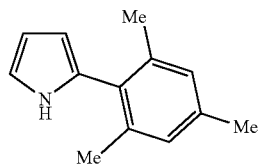 [SMILES: Cc1cc(C)c(-c2ccc[nH]2)c(C)c1]

In a nitrogen-filled glovebox, sodium methoxide (2.51 g, 46.46 mmol, 3 equiv.) was added to a solution of tert-butyl 2-phenyl-1H-pyrrole-1-carboxylate (12) (4.42 g, 15.5 mmol, 1 equiv.) in THF (45 mL). The vessel was capped with a septum and removed from the glove box. Anhydrous methanol (12 mL) was added via syringe, and the reaction was stirred at room temperature for 18 h. No significant color change was observed. The solution was concentrated in vacuo to yield an off-white solid. Water (120 mL) was added, and the aqueous phase was extracted with diethyl ether (3×60 mL). The combined organic phases were dried over MgSO₄, filtered, and concentrated in vacuo to yield a white solid (2.55 g, 89% yield).

$^1$H NMR (400 MHz, Chloroform-d) δ 7.85 (br s, 1H), 6.94 (s, 2H), 6.87-6.82 (m, 1H), 6.31 (td, J=3.1, 2.2 Hz, 1H), 6.06 (td, J=2.6, 1.4 Hz, 1H), 2.33 (s, 3H), 2.13 (s, 6H). $^{13}$C NMR (101 MHz, Chloroform-d) δ 138.55, 137.59, 130.68, 129.47, 128.06, 116.82, 108.44, 108.16, 21.06, 20.53.

Example 11: Synthesis of 1-(5-mesityl-1H-pyrrol-2-yl)-N,N-dimethylmethanamine-Ligand 2

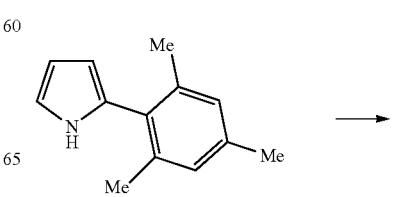

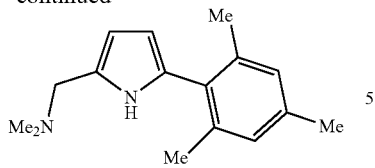

To a reaction vial was added dimethylamine hydrochloride (1.0854 g, 13.3 mmol, 1 equiv.), 37% formaldehyde solution (1.05 mL, 14.0 mmol, 1.05 equiv.), and isopropanol (6 mL). The vial was capped, and the reaction was stirred at room temperature for 30 minutes. Subsequently, the solution was added via syringe to a vial under a nitrogen atmosphere containing 2-mesityl-1H-pyrrole (13) (2.466 g, 13.3 mmol, 1 equiv.). The formaldehyde vial was rinsed with additional isopropanol (1 mL), and this was added to the pyrrole solution. The reaction was stirred at 40° C. for 96 h. A 10% aqueous solution of KOH (75 mL) was added, and the reaction was stirred for 1 h. The aqueous phase was extracted with dichloromethane (3×60 mL). The combined organic phases were dried over MgSO₄, filtered, and concentrated in vacuo to yield the product as a red solid (3.36 g, 98% yield).

$^1$H NMR (400 MHz, Chloroform-d) δ 9.15 (br s, 1H), 6.88 (d, J=0.9 Hz, 2H), 6.06 (t, J=2.9 Hz, 1H), 5.89 (t, J=2.9 Hz, 1H), 3.41 (s, 2H), 2.29 (s, 3H), 2.10 (s, 6H), 2.06 (s, 6H). $^{13}$C NMR (101 MHz, Chloroform-d) δ 138.29, 137.23, 131.22, 129.55, 128.11, 127.89, 107.94, 107.43, 56.77, 44.69, 21.06, 20.60.

Example 12: Synthesis of 1-(5-mesityl-H-pyrrol-2-yl)-N,N,N-trimethylmethanaminium iodide (14)

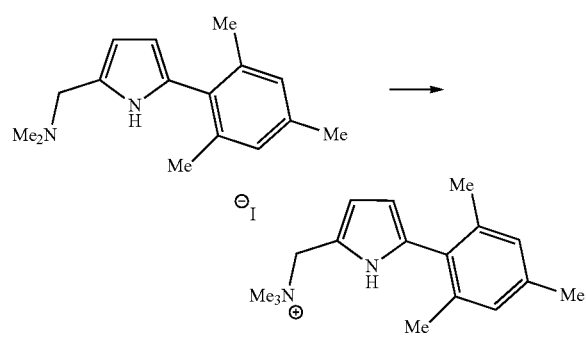

In a nitrogen-filled glovebox, a 250 mL round bottom flask was charged with 1-(5-mesityl-1H-pyrrol-2-yl)-N,N-dimethylmethanamine (2.91 g, 12.0 mmol, 1 equiv.) and dissolved in THF (140 mL). The flask was sealed with a septum and removed from the glove box. A solution of methyl iodide (0.75 mL, 12.0 mmol, 1 equiv.) in THF (12 mL) was added to the stirring pyrrole solution dropwise. The mixture was stirred at room temperature for 2 h, resulting in the precipitation of copious amounts of a white solid. The slurry was filtered, the solid was washed with THF (3×20 mL), and dried in vacuo to afford an off-white solid (3.586 g, 78% yield).

$^1$H NMR (400 MHz, DMSO-d₆) δ 11.19 (br s, 1H), 6.90 (s, 2H), 6.43-6.38 (m, 1H), 6.01-5.94 (m, 1H), 4.42 (s, 2H), 2.97 (s, 9H), 2.23 (s, 3H), 2.03 (s, 6H). $^{13}$C NMR (101 MHz, DMSO-d₆) δ 137.73, 137.41, 132.46, 130.49, 128.29, 118.16, 114.56, 109.15, 62.48, 51.91, 51.87, 51.83, 21.12, 20.78.

Example 13: Synthesis of (2S,2'S)-1,1'-bis((5-mesityl-1H-pyrrol-2-yl)methyl)-2,2'-bipyrrolidine-Ligand 3

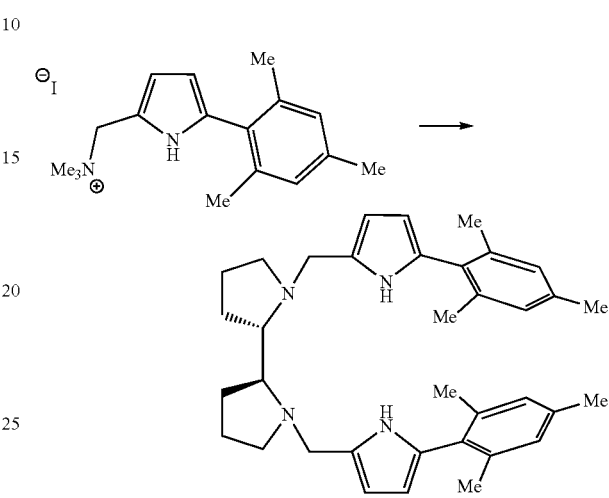

A reaction vial was charged with 1-(5-mesityl-1H-pyrrol-2-yl)-N,N,N-trimethylmethanaminium iodide (14) (1.20 g, 3.12 mmol, 2 equiv.), (2S,2'S)-2,2'-bipyrrolidine (0.219 g, 1.56 mmol, 1 equiv.), and anhydrous K₂CO₃ (2.16 g, 15.6 mmol, 10 equiv.). The vial was capped and purged with nitrogen. Acetonitrile (12 mL) was added via syringe and the reaction is stirred at 72° C. for 20 h. The suspension was poured onto water (150 mL). The aqueous phase was extracted with dichloromethane (3×50 mL). The combined organic phases were dried over MgSO₄, filtered, and concentrated in vacuo. The material was adsorbed onto basic alumina and purified via flash column chromatography (ISCO, 160 g basic alumina, 15-35% EtOAc in hexanes) to afford the product as a white powder (0.573 g, 69% yield).

$^1$H NMR (400 MHz, Chloroform-d) δ 9.58 (br s, 2H), 6.91 (s, 4H), 6.01-5.98 (m, 2H), 5.95-5.92 (m, 2H), 3.93 (d, J=14.2 Hz, 2H), 3.50 (d, J=14.2 Hz, 2H), 2.82-2.68 (m, 4H), 2.32 (s, 6H), 2.14 (s, 12H), 2.13-2.07 (m, 2H), 1.88-1.40 (m, 8H). $^{13}$C NMR (101 MHz, Chloroform-d) δ 138.18, 136.99, 131.27, 129.31, 128.34, 128.03, 108.15, 105.37, 65.73, 54.82, 52.46, 26.91, 23.71, 21.05, 20.84. HRMS (ESI) Calculated for C₃₆H₄₆N₄[M+H]⁺: 535.3795; found 535.3798.

Example 14: Synthesis of N¹,N²-bis((5-mesityl-1H-pyrrol-2-yl)methyl)-N⁴,N²-dimethylethane-1,2-diamine-Ligand 9

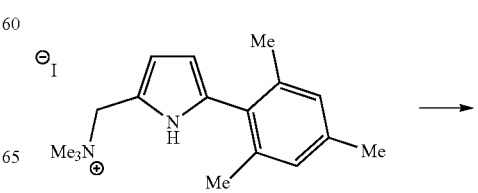

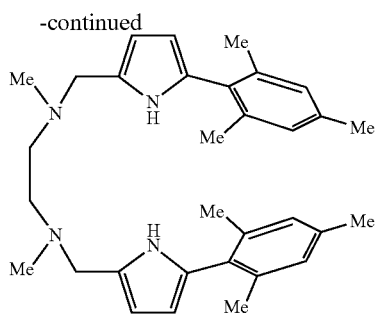

A 50 mL round bottom flask was charged with 1-(5-mesityl-1H-pyrrol-2-yl)-N,N,N-trimethylmethanaminium iodide (14) (2.0 g, 5.20 mmol, 2 equiv.) and anhydrous $K_2CO_3$ (3.60 g, 26.0 mmol, 10 equiv.). The vial was capped and purged with nitrogen. DMEDA (0.28 mL, 2.60 mmol, 1 equiv.) and acetonitrile (20 mL) were added via syringe and the reaction is stirred at 72° C. for 20 h. The suspension was poured onto water (150 mL). The aqueous phase was extracted with dichloromethane (3×50 mL). The combined organic phases were dried over $MgSO_4$, filtered, and concentrated in vacuo. The material was adsorbed onto basic alumina and purified via flash column chromatography (ISCO, 160 g basic alumina, 30-70% EtOAc in hexanes) to afford the product as a white solid (0.494 g, 39% yield).

$^1$H NMR (400 MHz, Chloroform-d) δ 9.01 (br s, 2H), 6.88 (s, 4H), 6.01 (t, J=2.9 Hz, 2H), 5.92 (t, J=2.9 Hz, 2H), 3.54 (s, 4H), 2.48 (s, 4H), 2.29 (s, 6H), 2.10 (s, 12H), 2.07 (s, 6H). $^{13}$C NMR (101 MHz, Chloroform-d) δ 138.08, 137.08, 131.02, 128.82, 128.28, 128.02, 108.11, 106.65, 55.07, 54.32, 42.65, 21.04, 20.71. Calculated for $C_{32}H_{42}N_4$ [M+H]$^+$: 483.3482; found 483.3486.

Example 15: Synthesis of 2-(anthracen-9-yl)-1H-pyrrole (17)

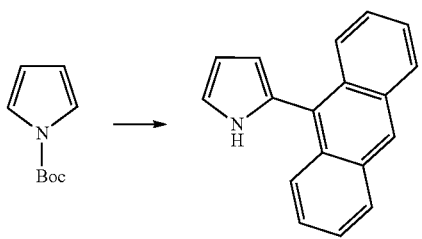 [SMILES: CC(C)(C)OC(=O)n1cccc1 ; c1c[nH]c(-c2c3ccccc3cc3ccccc23)c1]

A 250 mL round bottom flask was charged with 9-bromoanthracene (12.85 g, 50.0 mmol, 1 equiv.), N-Boc-pyrrole 2-boronic acid (15.2 g, 75.0 mmol, 1.5 equiv.), anhydrous $K_3PO_4$ (21.2 g, 99.9 mmol, 2 equiv.), Pd(OAc)$_2$ (224 mg, 0.999 mmol, 2 mol %), and SPhos (0.821 g, 1.99 mmol, 4 mol %). Vessel was sealed with a septum, and subsequently evacuated and backfilled with nitrogen three times. Anhydrous 1-butanol (100 mL) was added via cannula, and the reaction was stirred at 100° C. for 4.5 h. The suspension was allowed to cool to room temperature for 16 h. The green slurry was cooled to filtered through a short plug of silica gel, which was eluted with EtOAc (3×50 mL), yielding a dark green solution. All volatiles were removed in vacuo. The remaining oil was adsorbed onto silica gel and purified via flash column chromatography (ISCO, 330 g silica gel, 1-3.8% EtOAc in hexanes eluent) to yield two large initial peaks. The first peak contained a mix of a clear oil and yellow solid (11.53 g). This material was determined to be a mix of 9-bromoanthracene, N-Boc-pyrrole (via protodeboronation), and tert-butyl 2-(anthracen-9-yl)-1H-pyrrole-1-carboxylate (13). The second peak was a brilliant yellow solid and corresponded to 2-(anthracen-9-yl)-1H-pyrrole (14) (4.73 g).

In a nitrogen-filled glovebox, sodium methoxide (6.00 g, 111 mmol) was added to a solution of the mixture containing 9-bromoanthracene, N-Boc-pyrrole (via protodeboronation), and tert-butyl 2-(anthracen-9-yl)-1H-pyrrole-1-carboxylate (16) (11.53 g) in THF (105 mL). The solution immediately turned red. The vessel was capped with a septum and removed from the glove box. Anhydrous methanol (30 mL) was added via syringe, and the reaction immediately turned amber. The solution was stirred at room temperature for 18 h, resulting in a green solution. The solution was concentrated in vacuo, yielding a bright yellow solid. Water (150 mL) was added and the aqueous phase was extracted with diethyl ether (3×75 mL), resulting in a dark black organic phase and a brown organic phase. The combined organic phases were dried over $MgSO_4$, resulting in a color change to tan. The suspension was filtered, and concentrated in vacuo to yield a yellow solid (6.34 g). NMR showed the material to be a mix of 9-bromoanthracene and the desired product. The material was adsorbed onto silica gel and purified by flash column chromatography (ISCO, 330 g silica gel, 0.1-6% EtOAc in hexanes) to yield the product as a brilliant yellow solid (2.89 g).

Combined total yield of 2-anthracen-9-yl-1H-pyrrole (17) over 2 steps: 7.62 g, 63% yield. $^1$H NMR (400 MHz, Chloroform-d) δ 8.44 (s, 1H), 8.17 (br s, 1H), 8.01 (d, J=8.4 Hz, 2H), 7.93 (d, J=8.7 Hz, 2H), 7.47 (ddd, J=8.3, 6.5, 1.3 Hz, 2H), 7.41 (ddd, J=8.1, 6.5, 1.4 Hz, 2H), 7.05-6.96 (m, 1H), 6.54 (q, J=3.0 Hz, 1H), 6.52-6.50 (m, 1H). $^{13}$C NMR (101 MHz, Chloroform-d) δ 131.75, 131.34, 128.58, 128.36, 127.36, 127.24, 126.70, 125.78, 125.24, 118.09, 111.36, 108.98.

Example 16: Synthesis of 1-(5-(anthracen-9-yl)-1H-pyrrol-2-yl)-N,N-dimethylmethanamine (18)

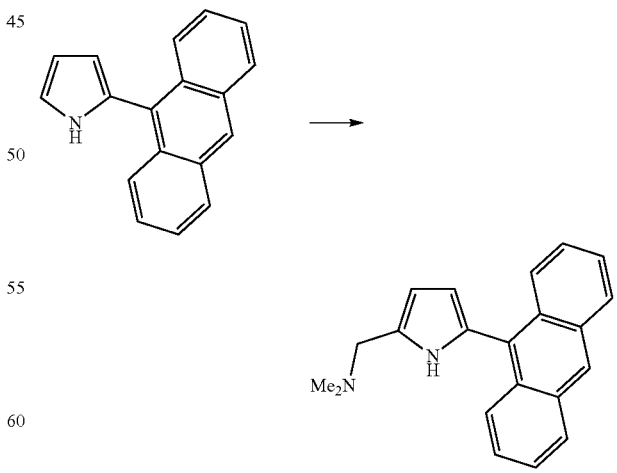

Dimethylamine hydrochloride (2.46 g, 30.2 mmol, 1 equiv.) was added to a reaction vial. The vessel was sealed with a screw-top septum, and the vessel was evacuated and backfilled with nitrogen three times, 37% formaldehyde solution (2.38 mL, 31.7 mmol, 1.05 equiv.) and isopropanol (16 mL) were added via syringe, and the solution was stirred at room temperature for 30 minutes. Subsequently, the solution was added via syringe to a 100 mL round bottom flask under a nitrogen atmosphere containing 2-(anthracen-9-yl)-1H-pyrrole (17) (7.34 g, 30.2 mmol, 1 equiv.). The formaldehyde vial was rinsed with additional isopropanol (3 mL), and this was added to the pyrrole solution. The reaction was stirred at 40° C. for 10 min, however a large amount of solid material was still present. An additional amount of isopropanol (20 mL) was added, and the yellow suspension was stirred at 45° C. for 5 days. A large amount of yellow solid still remained. A 10% aqueous solution of KOH (200 mL) was added, and the reaction was stirred for 2 h. The aqueous phase was extracted with dichloromethane (3×75 mL). The combined organic phases were dried over $MgSO_4$ and filtered, yielding a bright yellow solution. The solution was concentrated in vacuo to yield the product as a yellow solid (8.77 g, 97% yield). Material still contained a small amount of isopropanol, despite multiple concentration washes with hexane and drying in vacuo overnight.

$^1$H NMR (400 MHz, Chloroform-d) δ 9.46 (s, 1H), 8.46 (s, 1H), 8.04-7.94 (m, 4H), 7.43 (dddd, J=19.3, 8.0, 6.5, 1.3 Hz, 4H), 6.34 (t, J=2.9 Hz, 1H), 6.24 (t, J=3.0 Hz, 1H), 3.46 (s, 2H), 2.01 (s, 6H). $^{13}$C NMR (101 MHz, Chloroform-d) δ 131.78, 131.35, 129.52, 129.31, 128.25, 127.05, 127.03, 126.86, 125.58, 125.16, 110.95, 108.33, 56.75, 44.80.

Example 17: Synthesis of 1-(5-(anthracen-9-yl)-1H-pyrrol-2-yl)-N,N,N-trimethylmethanaminium iodide (19)

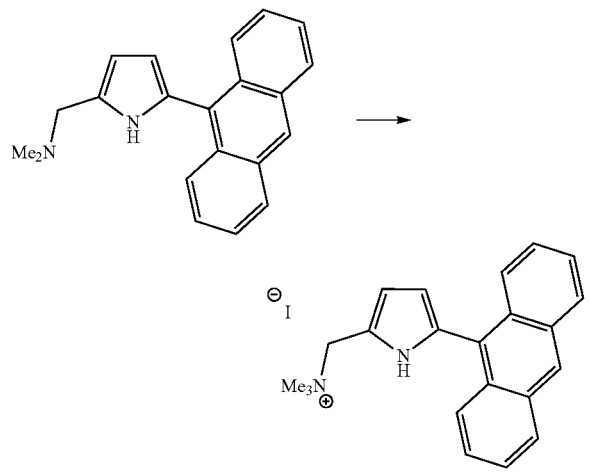

In a nitrogen-filled glovebox, a 500 mL round bottom flask was charged with 1-(5-(anthracen-9-yl)-1H-pyrrol-2-yl)-N,N-dimethylmethanamine (18) (8.41 g, 28.0 mmol, 1 equiv.) and dissolved in THF (250 mL). The vessel was sealed with a septum a removed from the glovebox. A solution of methyl iodide (1.74, 28.0 mmol, 1 equiv.) in THF (15 mL) was added to the stirring pyrrole solution via cannula. The mixture was stirred at room temperature for 3 h, resulting in the precipitation of copious amounts of a yellow solid. The slurry was filtered, the solid was washed with THF (3×20 mL), and dried in vacuo to yield the solid as a yellow powder (4777-A, 11.6 g, 94% yield).

$^1$H NMR (400 MHz, DMSO-$d_6$) δ 11.79 (s, 1H), 8.69 (s, 1H), 8.15-8.09 (m, 2H), 7.81-7.76 (m, 2H), 7.54-7.43 (m, 4H), 6.67 (t, J=2.9 Hz, 1H), 6.41 (t, J=2.9 Hz, 1H), 4.58 (s, 2H), 3.09 (s, 9H). $^{13}$C NMR (101 MHz, DMSO-$d_6$) δ 131.45, 131.28, 130.06, 128.81, 128.30, 128.30, 127.83, 126.66, 126.59, 125.88, 119.66, 115.01, 112.15, 62.40, 52.15, 52.11, 52.07.

Example 18: Synthesis of (2S,2'S)-1,1'-bis((5-(anthracen-9-yl)-1H-pyrrol-2-yl)methyl)-2,2'-bipyrrolidine-Ligand 10

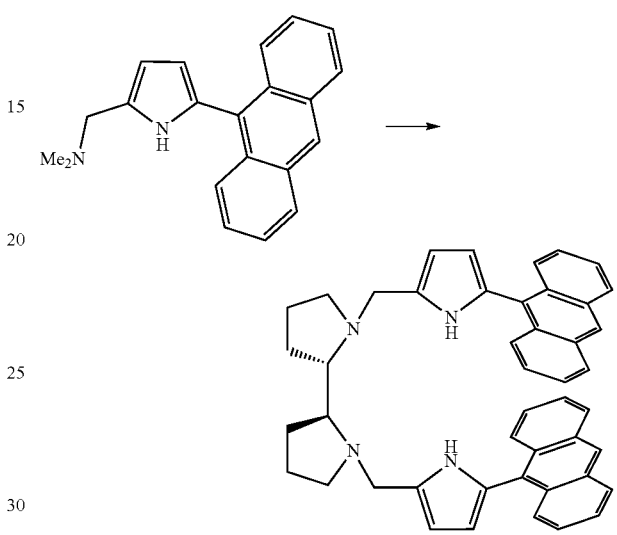

A 50 mL round bottom flask was charged with (2S,2'S)-2,2'-bipyrrolidine (0.317 g, 2.26 mmol, 1 equiv.), 1-(5-(anthracen-9-yl)-1H-pyrrol-2-yl)-N,N,N-trimethylmethanaminium iodide (19) (2.00 g, 4.52 mmol, 2 equiv.) and anhydrous $K_2CO_3$ (3.12 g, 21.1 mmol, 10 equiv.). The vial was capped and purged with nitrogen. Acetonitrile (20 mL) was added via syringe and the reaction is stirred at 72° C. for 19 h. The suspension was poured onto water (150 mL). The aqueous phase was extracted with dichloromethane (3×50 mL). The combined organic phases were dried over $MgSO_4$, filtered, and concentrated in vacuo. The material was adsorbed onto basic alumina and purified via flash column chromatography (ISCO, 160 g basic alumina, 20-50% EtOAc in hexanes) to afford the product as a bright yellow solid (1.08 g, 74% yield).

$^1$H NMR (400 MHz, Chloroform-d) δ 11.30 (s, 2H), 8.43 (s, 2H), 8.24 (dd, J=8.8, 1.2 Hz, 4H), 8.03-7.97 (m, 4H), 7.43 (ddd, J=8.3, 6.5, 1.2 Hz, 4H), 7.31 (ddd, J=8.9, 6.5, 1.3 Hz, 4H), 6.43 (dd, J=3.2, 2.5 Hz, 2H), 6.06 (t, J=2.8 Hz, 2H), 3.74 (d, J=14.6 Hz, 2H), 3.00 (d, J=14.6 Hz, 2H), 2.80-2.72 (m, 2H), 2.41-2.27 (m, 2H), 1.78-1.14 (m, 10H). $^{13}$C NMR (101 MHz, Chloroform-d) δ 131.42, 131.29, 130.91, 129.72, 128.19, 127.08, 126.45, 125.80, 125.36, 125.14, 111.65, 105.34, 66.32, 54.31, 52.76, 27.18, 23.66. HRMS (ESI) Calculated for $C_{46}H_{42}N_4[M+H]^+$: 651.3482; found 651.3481.

Example 19: Synthesis of sodium pyrrol-1-ide

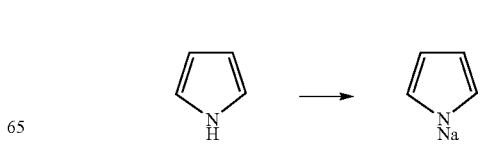

In a nitrogen-filled glovebox, pyrrole (1.9 mL, 27.4 mmol, 1 equiv.) and THF (50 mL) were added to a 200 mL reaction jar. Sodium hydride (1.31 g, 54.8 mmol, 2 equiv.) was added slowly, resulting in the evolution of hydrogen gas. The reaction was stirred at room temperature for 30 min, after which the evolution of gas had ceased. The suspension was filtered, the solid washed with THF (2×5 mL), and the solution was concentrated in vacuo to yield a white solid with some thick oil. The material was triturated with hexanes (30 mL) and dried in vacuo at 60° C. to yield a white powder (2.35 g, 96% yield).

$^1$H NMR (400 MHz, THF-d$_8$) δ 6.77 (s, 2H), 6.03 (s, 2H). $^{13}$C NMR (101 MHz, THF-d$_8$) δ 128.48, 106.81.

Example 20: Synthesis of 2-(2,6-diisopropylphenyl)-1H-pyrrole (21)

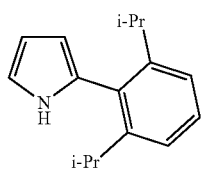 [SMILES: CC(C)c1cccc(C(C)C)c1-c1ccc[nH]1]

In a nitrogen-filled glovebox, a 200 mL round bottom flask was charged with sodium pyrrol-1-ide (13.0 g, 146 mmol, 4 equiv.) and THF (36 mL). The flask was attached to an aluminum heating block to act as a heat sink. Anhydrous ZnCl2 (19.9 g, 146 mmol, 4 equiv.) was added slowly. However, even with slow addition, the THF suddenly began to reflux, and therefore an air-cooled coil reflux condenser was attached. The slurry was stirred at room temperature for 15 min. Subsequently, the reflux condenser was removed and CyJohnPhos (0.511 g, 1.46 mmol, 4 mol %), Pd$_2$dba$_3$ (0.667 mg, 0.7283 mmol, 2 mol %), and 1-bromo-2,6-diisopropylbenzene (7.5 mL, 36.4 mmol, 1 equiv.) were added sequentially. The reflux condenser was reattached, and the black solution was stirred at 100° C. for 42 h. The reaction was allowed to cool to room temperature, capped, and transferred to a fume hood. Water (10 mL) was added to quench any remaining sodium pyrrol-1-ide, and all volatiles were removed in vacuo. The black material was dissolved in water (200 mL) and ether (150 mL). A thick emulsion formed which would not separate. A large amount of black slimy solid was present, presumably zinc salts. The water/ether emulsion was filtered through a short pad of celite. During the filtration, the top of the celite had to be continuously scraped to allow the liquid to pass through. The remaining solid filter cake was further washed with ether (4×50 mL). Now, a clear, yellow aqueous phase and black organic phase were sufficiently separated to allow for extraction. The aqueous phase was further washed with ether (3×50 mL). The combined organic layers were dried over MgSO$_4$, filtered, and concentrated in vacuo. The material was adsorbed onto silica gel and purified by flash column chromatography (ISCO, 330 g silica gel, 1-3.5% EtOAc in hexane) to yield the product as a yellow solid (6.18 g, 75% yield).

$^1$H NMR (400 MHz, Chloroform-d) δ 7.91 (s, 1H), 7.37 (t, J=7.7 Hz, 1H), 7.20 (d, J=7.7 Hz, 2H), 6.85 (dt, J=2.8, 1.6 Hz, 1H), 6.32 (q, J=2.9 Hz, 1H), 6.14-6.06 (m, 1H), 2.73 (hept, J=6.9 Hz, 2H), 1.14 (d, J=6.9 Hz, 12H). $^{13}$C NMR (101 MHz, cdcl$_3$) δ 149.85, 131.17, 128.86, 128.83, 122.49, 116.63, 108.93, 108.35, 30.52, 24.58.

Example 21: Synthesis of 1-(5-(2,6-diisopropylphenyl)-1H-pyrrol-2-yl)-N,N-dimethylmethanamine (22)

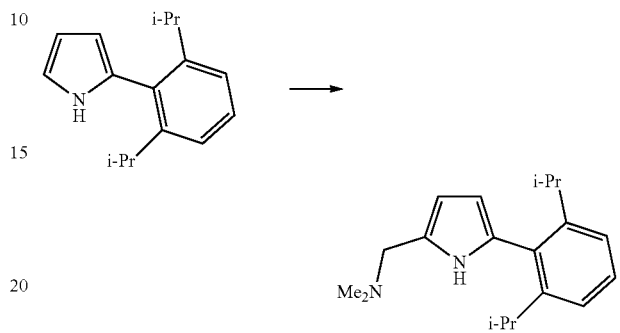

To a reaction vial was added dimethylamine hydrochloride (1.97 g, 24.2 mmol, 1 equiv.), 37% formaldehyde solution (1.91 mL, 25.40 mmol, 1.05 equiv.), and isopropanol (11 mL). The vial was capped, and the reaction was stirred at room temperature for 45 minutes. Subsequently, the solution was added via syringe to a 50 mL round bottom flask under a nitrogen atmosphere containing 2-(2,6-diisopropylphenyl)-1H-pyrrole (21) (5.50 g, 24.2 mmol, 1 equiv.). The formaldehyde vial was rinsed with additional isopropanol (2 mL), and this was added to the pyrrole solution. The reaction was stirred at 40° C., however initially a significant amount of the pyrrole did not dissolve in solution. Additional isopropanol (5 mL) was added, the reaction was stirred at 45° C., and after 30 minutes all material went into solution. The reaction was stirred at 45° C. for 72 h. A 10% aqueous solution of KOH (125 mL) was added, and the reaction was stirred for 1 h. The aqueous phase was extracted with dichloromethane (3×75 mL). The combined organic phases were dried over MgSO$_4$, filtered, and concentrated in vacuo to yield the product as a light tan solid (6.80 g, 99% yield). Several cycles of dissolving in hexanes, concentration, and drying in vacuo were necessary to remove all residual solvent.

$^1$H NMR (400 MHz, Chloroform-d) δ 8.18 (br s, 1H), 7.34 (t, J=7.7 Hz, 1H), 7.17 (d, J=7.7 Hz, 2H), 6.07 (t, J=3.0 Hz, 1H), 5.96 (t, J=2.9 Hz, 1H), 3.46 (s, 2H), 2.79 (hept, J=6.9 Hz, 2H), 2.21 (s, 6H), 1.13 (d, J=7.0 Hz, 12H). $^{13}$C NMR (Error! Reference source not found. 101 MHz, Chloroform-d) δ 149.68, 131.53, 128.65, 128.37, 128.29, 122.34, 108.46, 107.05, 56.66, 44.97, 30.48, 24.50.

Example 22: Synthesis of 1-(5-(2,6-diisopropylphenyl)-1H-pyrrol-2-yl)-N,N,N-trimethylmethanaminium iodide (23)

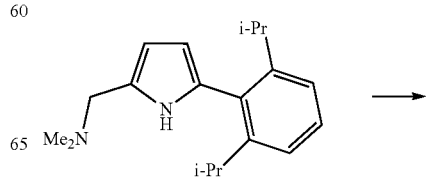

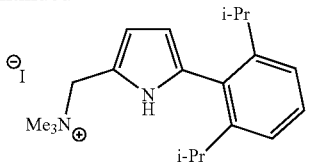

In a nitrogen-filled glovebox, a 250 mL round bottom flask was charged with 1-(5-(2,6-diisopropylphenyl)-1H-pyrrol-2-yl)-N,N-dimethylmethanamine (22) (6.2 g, 21.8 mmol, 1 equiv.) and dissolved in THF (150 mL). The flask was sealed with a septum and removed from the glove box. A solution of methyl iodide (1.36 mL, 21.8 mmol, 1 equiv.) in THF (15 mL) was added to the stirring pyrrole solution dropwise. The mixture was stirred at room temperature for 2 h, resulting in the precipitation of copious amounts of a white solid. The slurry was filtered, the solid was washed with THF (2×10 mL), and dried in vacuo to afford a white solid (5.94 g, 71% yield).

$^1$H NMR (400 MHz, Chloroform-d) δ 10.22 (br s, 1H), 7.34 (t, J=7.7 Hz, 1H), 7.13 (d, J=7.8 Hz, 2H), 6.40 (t, J=3.0 Hz, 1H), 6.01 (d, J=3.0 Hz, 1H), 4.95 (s, 2H), 3.17 (s, 9H), 2.58 (hept, J=6.8 Hz, 2H), 1.07 (d, J=6.9 Hz, 12H). $^{13}$C NMR (101 MHz, Chloroform-d) δ 149.38, 132.83, 129.97, 129.20, 122.49, 116.81, 114.56, 109.99, 62.18, 52.28, 30.67, 24.88, 24.09.

Example 23: Synthesis of (2S,2'S)-1,1'-bis((5-(2,6-diisopropylphenyl)-1H-pyrrol-2-yl)methyl)-2,2'-bipyrrolidine-Ligand 7

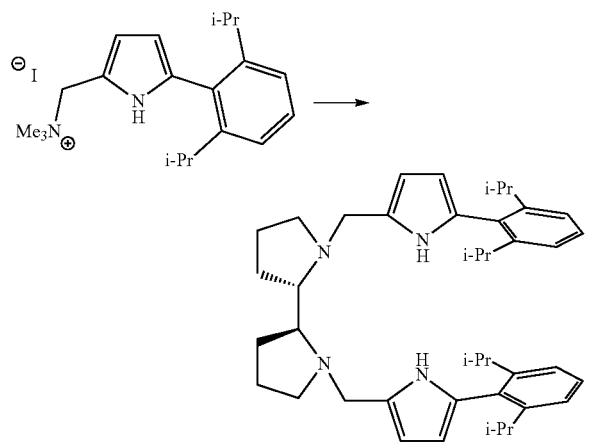

A 50 mL round bottom flask was charged with (2S,2'S)-2,2'-bipyrrolidine (0.296 g, 2.11 mmol, 1 equiv.), 1-(5-(2,6-diisopropylphenyl)-1H-pyrrol-2-yl)-N,N,N-trimethylmethanaminium iodide (23) (1.80 g, 4.22 mmol, 2 equiv.) and anhydrous K$_2$CO$_3$ (2.92 g, 21.1 mmol, 10 equiv.). The vial was capped and purged with nitrogen. Acetonitrile (16 mL) was added via syringe and the reaction is stirred at 72° C. for 19 h. The suspension was poured onto water (150 mL). The aqueous phase was extracted with dichloromethane (3×50 mL). The combined organic phases were dried over MgSO$_4$, filtered, and concentrated in vacuo. The material was adsorbed onto basic alumina and purified via flash column chromatography (ISCO, 160 g basic alumina, 10-50% EtOAc in hexanes) to afford the product as a white solid (1.15 g, 88% yield).

$^1$H NMR (400 MHz, Chloroform-d) δ 8.50 (br s, 2H), 7.34 (t, J=7.7 Hz, 2H), 7.17 (d, J=7.7 Hz, 4H), 6.00 (t, J=2.9 Hz, 2H), 5.94 (t, J=2.9 Hz, 2H), 3.95 (d, J=14.0 Hz, 2H), 3.40 (d, J=14.0 Hz, 2H), 2.92-2.82 (m, 4H), 2.73-2.64 (m, 4H), 2.19-2.10 (m, 2H), 1.76-1.48 (m, 8H), 1.11 (d, J=6.9 Hz, 24H). $^{13}$C NMR (101 MHz, Chloroform-d) δ 149.68, 131.75, 129.26, 128.61, 127.58, 122.45, 108.69, 105.71, 65.00, 55.38, 51.94, 30.52, 26.30, 25.16, 24.58, 24.14, 23.67. HRMS (ESI) Calculated for C$_{42}$H$_{58}$N$_4$[M+H]$^+$: 619.4734; found 617.4753.

Example 24: Synthesis of N$^1$,N$^2$-bis((5-(2,6-diisopropylphenyl)-1H-pyrrol-2-yl)methyl)-N$^1$,N$^2$-dimethylethane-1,2-diamine-Ligand 6

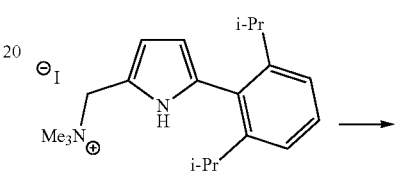

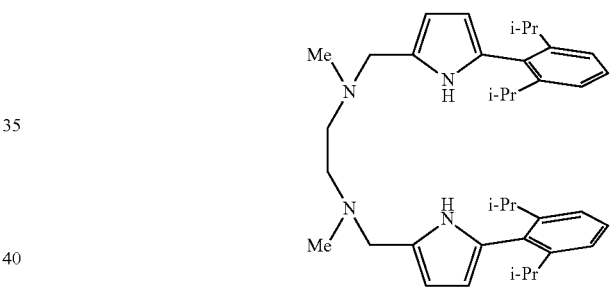

A 50 mL round bottom flask was charged with 1-(5-(2,6-diisopropylphenyl)-1H-pyrrol-2-yl)-N,N,N-trimethylmethanaminium iodide (23) (1.80 g, 4.22 mmol, 2 equiv.) and anhydrous K$_2$CO$_3$ (2.92 g, 21.1 mmol, 10 equiv.). The vial was capped and purged with nitrogen. DMEDA (0.23 mL, 2.11 mmol, 1 equiv.) and acetonitrile (16 mL) was added via syringe and the reaction was stirred at 72° C. for 19 h. The suspension was poured onto water (150 mL). The aqueous phase was extracted with dichloromethane (3×50 mL). The combined organic phases were dried over MgSO$_4$, filtered, and concentrated in vacuo. The material was adsorbed onto basic alumina and purified via flash column chromatography (ISCO, 160 g basic alumina, 30-70% EtOAc in hexanes) to afford the product as a thick, foamy, sticky white semisolid (0.833 g, 74% yield).

$^1$H NMR (400 MHz, Chloroform-d) δ 8.35 (br s, 2H), 7.32 (t, J=7.7 Hz, 2H), 7.15 (d, J=7.7 Hz, 4H), 6.04-5.99 (m, 2H), 5.93 (t, J=2.9 Hz, 2H), 3.52 (s, 4H), 2.76 (hept, J=6.8 Hz, 4H), 2.50 (s, 4H), 2.15 (s, 6H), 1.09 (d, J=6.9 Hz, 24H). $^{13}$C NMR (101 MHz, Chloroform-d) δ 149.63, 131.57, 128.68, 128.20, 127.97, 122.39, 108.69, 107.19, 55.17, 54.58, 42.43, 30.50, 24.78, 24.28. HRMS (ESI) Calculated for C$_{38}$H$_{54}$N$_4$[M+H]$^+$: 567.4421; found 567.4429.

Example 25: Synthesis of N¹,N³-bis((5-(2,6-diisopropylphenyl)-1H-pyrrol-2-yl)methyl)-N¹,N³-dimethylpropane-1,3-diamine-Ligand 11

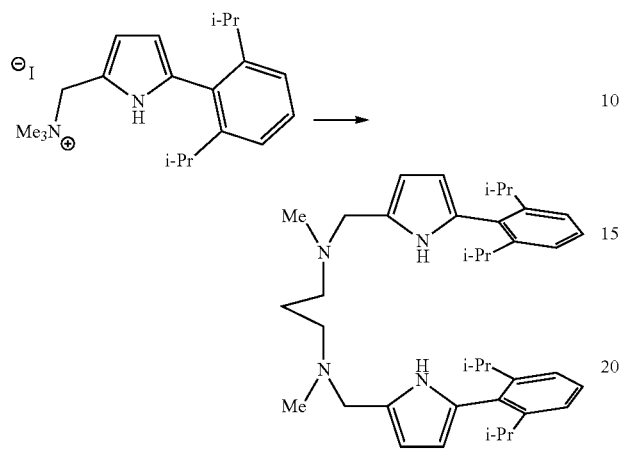

A 50 mL round bottom flask was charged with 1-(5-(2,6-diisopropylphenyl)-1H-pyrrol-2-yl)-N,N,N-trimethylmethanaminium iodide (23) (1.80 g, 4.22 mmol, 2 equiv.) and anhydrous K2CO3 (2.92 g, 21.1 mmol, 10 equiv.). The vial was capped and purged with nitrogen. $N^1,N^3$-dimethylpropane-1,3-diamine (0.26 mL, 2.11 mmol, 1 equiv.) and acetonitrile (16 mL) were added and the reaction is stirred at 72° C. for 19 h. The suspension was poured onto water (150 mL). The aqueous phase was extracted with dichloromethane (3×50 mL). The combined organic phases were dried over MgSO$_4$, filtered, and concentrated in vacuo. The material was adsorbed onto basic alumina and purified via flash column chromatography (ISCO, 160 g basic alumina, 30-70% EtOAc in hexanes) to afford the product as a white solid (0.607 g, 49% yield).

¹H NMR (400 MHz, Chloroform-d) δ 8.83 (br s, 2H), 7.33 (t, J=7.7 Hz, 2H), 7.17 (d, J=7.7 Hz, 4H), 5.99 (t, J=2.9 Hz, 2H), 5.95 (t, J=2.9 Hz, 2H), 3.46 (s, 4H), 2.76 (hept, J=6.9 Hz, 4H), 2.39 (t, J=7.2 Hz, 4H), 2.05 (s, 6H), 1.67 (t, J=7.2 Hz, 2H), 1.10 (d, J=6.9 Hz, 24H). ¹³C NMR (101 MHz, Chloroform-d) δ 149.67, 131.88, 128.63, 128.06, 127.84, 122.30, 108.73, 106.42, 55.09, 54.12, 41.86, 30.47, 25.07, 24.84, 23.90. HRMS (ESI) Calculated for $C_{39}H_{56}N_4$ [M+H]⁺: 581.4578; found 584.4598.

Example 26: Synthesis of N,N-dimethyl-1-(1H-pyrrol-2-yl)methanamine (27)

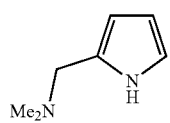

A 100 mL round bottom flask fitted with a condenser, under nitrogen, was charged with pyrrole (2.55 ml, 36.8 mmol, 1.0 equiv.) and isopropanol (20 mL). Dimethylamine hydrochloride (3.00 g, 36.8 mmol, 1.0 equiv.) was added. Subsequently, a 37% formaldehyde solution (3.10 mL, 40.4 mmol, 1.10 equiv.) was added dropwise. The reaction was stirred at 40° C. for 3 days. A 5% aqueous solution of sodium hydroxide (50 mL) was added, and the reaction was stirred for 15 minutes. The aqueous phase was extracted with ether (3×60 mL). The combined organic phases were washed with water (30 mL) and brine (30 mL). The organic phase was dried over MgSO$_4$, filtered, and concentrated in vacuo to yield a brown oil. The material was purified via vacuum distillation. (The external temperature ranged from 88-100° C. The internal temperature was 47° C.) A white crystalline product was isolated (3.290 g, 72% yield).

¹H NMR (400 MHz, Chloroform-d) δ 8.92 (br s, 1H), 6.70 (ddd, J=2.7, 2.0, 1.1 Hz, 1H), 6.09 (q, J=2.9 Hz, 1H), 6.03-5.98 (m, 1H), 3.41 (s, 2H), 2.21 (s, 6H). ¹³C NMR (101 MHz, Chloroform-d) δ 129.24, 117.52, 107.65, 107.31, 56.62, 45.10.

Example 27: Synthesis of tert-butyl 2-((dimethylamino)methyl)-1H-pyrrole-1-carboxylate (28)

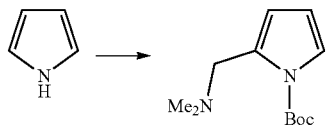 [SMILES: c1cc[nH]c1 ; CN(C)Cc1cccn1C(=O)OC(C)(C)C]

To a 250 ml round bottom flask was added of N,N-dimethyl-1-(1H-pyrrol-2-yl)methanamine (27) (2.675 g, 21.5 mmol, 1.00 equiv.) and anhydrous dichloromethane (90 mL). The reaction flask was cooled in an ice bath, and 4-(dimethylamino)pyridine (0.394 g, 3.23 mmol, 0.15 equiv.) was added, followed by di-tert-butyl dicarbonate (5.17 g, 23.7 mmol, 1.1 equiv.). The reaction was stirred, warming to room temperature, for a total of 18 h. The reaction was quenched by adding water (100 mL) and the mixture was stirred for 20 minutes. The organic phase was extracted off and the aqueous phase was extracted with ether (2×50 mL). The combined organic phases were extracted with water (2×50 mL) and brine (50 mL). The organic phase was dried over MgSO$_4$, filtered, and concentrated in vacuo. The material was purified via vacuum distillation. (The external temperature ranged from 88-108° C. The internal temperature was 60° C.) A clear oil was isolated (2.694 g, 56% yield).

¹H NMR (400 MHz, Chloroform-d) δ 7.20 (dd, J=3.3, 1.8 Hz, 1H), 6.16-6.12 (m, 1H), 6.10 (t, J=3.3 Hz, 1H), 3.67 (s, 2H), 2.28 (s, 6H), 1.59 (s, 9H). ¹³C NMR (101 MHz, Chloroform-d) δ 149.38, 132.75, 121.54, 113.32, 109.74, 83.35, 56.66, 45.56, 28.04.

Example 28: Synthesis of N-(t-butoxycarbonyl)-2-(trimethylaminomethyl)pyrrole iodide (29)

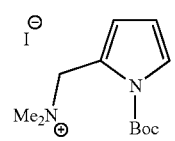

A 250 mL round bottom flask, under nitrogen, was charged with tert-butyl 2-((dimethylamino)methyl)-1H-pyrrole-1-carboxylate (28) (2.69 g, 120 mmol, 1 equiv.) and THF (50 mL). Methyl iodide (0.82 mL, 13.2 mmol, 1.1 equiv.) was added to the stirring BOC-protected pyrrole solution dropwise. The mixture was stirred at room temperature for 18 h, resulting in the precipitation of a white solid. The suspension was placed in freezer to cool. The slurry was filtered, the solid was washed with THF (30 mL), and dried in vacuo to afford a white solid (4.184 g, 95% yield).

$^1$H NMR (400 MHz, Chloroform-d) δ 7.32 (dd, J=3.4, 1.7 Hz, 1H), 6.85 (dd, J=3.5, 1.7 Hz, 1H), 6.24 (t, J=3.4 Hz, 1H), 5.21 (s, 2H), 3.36 (s, 9H), 1.55 (s, 9H). $^{13}$C NMR (101 MHz, cdcl$_3$) δ 149.30, 125.40, 123.16, 120.94, 111.28, 85.88, 61.31, 52.82, 52.79, 52.75, 27.88.

Example 29: Synthesis of N$^1$,N$^2$-bis((1H-pyrrol-2-yl)methyl)-N$^1$,N$^2$-dimethylethane-1,2-diamine (30)-Comparative Ligand C1

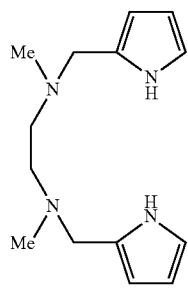 [SMILES: CN(CCN(C)Cc1ccc[nH]1)Cc1ccc[nH]1]

In a nitrogen-filled glove box, a 250 mL round bottom flask was charged with N-(t-butoxycarbonyl)-2-(trimethylaminomethyl)pyrrole iodide (29) (2.0 g, 5.46 mmol, 2.1 equiv.) and anhydrous K$_2$CO$_3$ (3.59 g, 26.0 mmol, 10 equiv.). DMEDA (0.28 mL, 2.69 mmol, 1 equiv.) and acetonitrile (60 mL) were added, and the reaction is stirred at reflux (105° C.) for 41 h. The suspension was diluted with ether (150 mL). The suspension was filtered and the solids were washed with ether. The filtrate was concentrated in vacuo. The material was purified via flash column chromatography (ISCO, 160 g basic alumina, 60-100% EtOAc in hexanes, then 1-10% methanol in ethyl acetate) to afford the product as a red-brown solid (0.214 g, 16% yield).

$^1$H NMR (400 MHz, Chloroform-d) δ 9.21 (br s, 2H), 6.71-6.65 (m, 2H), 6.12 (q, J=2.9 Hz, 2H), 6.02-5.96 (m, 2H), 3.56 (s, 4H), 2.47 (s, 4H), 2.23 (s, 6H). $^{13}$C NMR (101 MHz, Chloroform-d) δ 129.23, 117.15, 107.99, 106.61, 54.76, 54.43, 42.93. HRMS (ESI) Calculated for C$_{14}$H$_{22}$N$_4$ [M+H]$^+$: 247.1917; found 247.1941.

Example 30: Synthesis of N$^1$,N$^2$-bis((1H-benzo[d]imidazol-2-yl)methyl)-N$^1$,N$^2$-dimethylethane-1,2-diamine-Ligand 5

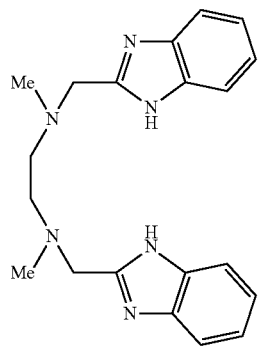 [SMILES: CN(CCN(C)Cc1nc2ccccc2[nH]1)Cc1nc2ccccc2[nH]1]

A 100 mL round bottom flask was charged with 2-(chloromethyl)benzimidazole (1.50 g, 9.03 mmol, 2 equiv.) and anhydrous K$_2$CO$_3$ (6.24 g, 45.2 mmol, 10 equiv.). The vessel was capped and purged with nitrogen. DMEDA (0.49 mL, 4.52 mmol, 1 equiv.) and acetonitrile (40 mL) were added via syringe and the reaction was stirred at 72° C. for 19 h. In the initial heating, the septum came off due to a slight pressure from heating, so the reaction was exposed to oxygen. The septum was quickly re-attached and the reaction stirred overnight without incident. The suspension was poured onto water (150 mL). The aqueous phase was extracted with dichloromethane (3×50 mL). The combined organic phases were dried over MgSO$_4$, filtered, and concentrated in vacuo. The material was adsorbed onto basic alumina and purified via flash column chromatography (ISCO, 160 g basic alumina, 2-5% MeOH in CH2Cl2) to yield a light yellow solid (1.21 g). HRMS matched the expected product [M+1], however the NMR contained broad peaks and other minor species. The broad peaks may be due to tautomerization, however the minor peaks should be removed before metallation. The solid was recrystallized from hot toluene (approximately 50 mL). Upon initial cooling at room temperature or in a freezer, no significant amount of material precipitated. However, upon leaving the material at room temperature over 3 days, solid did precipitate. The suspension was cooled again in a freezer. The solid was filtered, washed with cold toluene, and dried in vacuo to afford a yellow solid (0.759 g, 48% yield).

$^1$H NMR (400 MHz, Chloroform-d, −40° C.) δ 13.11 (br s, 2H), 7.71 (d, J=7.5 Hz, 2H), 7.34-7.13 (m, 6H), 4.14 (s, 4H), 2.66 (s, 4H), 2.44 (s, 6H). $^{13}$C NMR (101 MHz, Chloroform-d, −40° C.) δ 152.79, 143.26, 133.79, 122.68, 122.21, 118.80, 111.26, 56.00, 54.72, 43.69. HRMS (ESI) Calculated for C$_{20}$H$_{24}$N$_6$[M+H]$^+$: 349.2135; found 349.2140.

Example 31: Synthesis of (2S,2'S)-1,1'-bis((1H-benzo[d]imidazol-2-yl)methyl)-2,2'-bipyrrolidine-Ligand 12

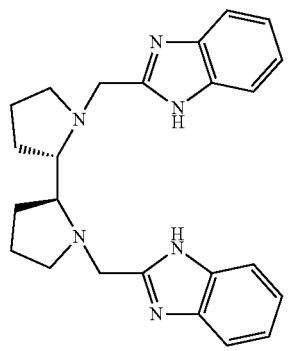 [SMILES: c1ccc2[nH]c(CN3CCC[C@H]3[C@@H]3CCCN3Cc3nc4ccccc4[nH]3)nc2c1]

A 100 mL round bottom flask was charged with (2S,2'S)-2,2'-bipyrrolidine (0.634 g, 4.52 mmol, 1 equiv.), 2-(chloromethyl)benzimidazole (1.50 g, 9.03 mmol, 2 equiv.) and anhydrous K$_2$CO$_3$ (6.24 g, 45.2 mmol, 10 equiv.). The vessel was capped and purged with nitrogen. Acetonitrile (40 mL) was added via syringe and the reaction is stirred at 72° C. for 19 h. The suspension was poured onto water (150 mL). The aqueous phase was extracted with dichloromethane (3×50 mL). The combined organic phases were dried over MgSO$_4$, filtered, and concentrated in vacuo. The material was adsorbed onto basic alumina and purified via flash column chromatography (ISCO, 160 g basic alumina, 1-3% MeOH in $CH_2Cl_2$) to yield an off-white powder (0.563 g, 31% yield). Cooling to −40° C. did result in some peaks appearing, but unlike 32 they were still extremely broad.

$^1$H NMR (400 MHz, Chloroform-d) δ 13.91 (br s, 2H), 7.52 (br s, 4H), 7.19 (dd, J=6.1, 3.2 Hz, 4H), 4.42 (d, J=15.5 Hz, 2H), 4.11 (d, J=15.5 Hz, 2H), 3.03 (dt, J=11.0, 6.6 Hz, 2H), 2.98-2.91 (m, 2H), 2.82 (dt, J=11.5, 6.5 Hz, 2H), 2.01-1.90 (m, 2H), 1.88-1.77 (m, 2H), 1.77-1.64 (m, 2H), 1.47-1.36 (m, 2H). $^{13}$C NMR (101 MHz, Chloroform-d) δ 152.74, 122.25, 67.25, 54.58, 54.23, 27.80, 24.01.

Example 32: Synthesis of $N^1,N^3$-bis((1H-benzo[d]imidazol-2-yl)methyl)-$N^1,N^3$-dimethylpropane-1,3-diamine-Ligand 4

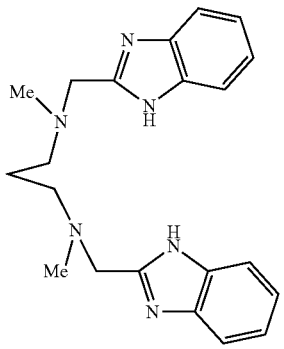 [SMILES: CN(CCCN(C)Cc1nc2ccccc2[nH]1)Cc1nc2ccccc2[nH]1]

A 100 mL round bottom flask was charged with 2-(chloromethyl)benzimidazole (1.50 g, 9.03 mmol, 2 equiv.) and anhydrous $K_2CO_3$ (6.24 g, 45.2 mmol, 10 equiv.). The vessel was capped and purged with nitrogen. N,N'-Dimethyl-1,3-propanediamine (0.57 mL, 4.52 mmol, 1 equiv.) and acetonitrile (40 mL) was added via syringe and the reaction is stirred at 72° C. for 17 h. The suspension was poured onto water (150 mL). The aqueous phase was extracted with dichloromethane (3×50 mL). The combined organic phases were dried over $MgSO_4$, filtered, and concentrated in vacuo. The material was adsorbed onto basic alumina and purified via flash column chromatography (ISCO, 160 g basic alumina, 1-3% MeOH in $CH_2Cl_2$) to afford two major peaks. The first peak (0.492 g) was isolated as a pale yellow solid. Upon cooling, even more material precipitated from solution. The material was dissolved in hot chloroform, which was then slowly cooled to −30° C. Hexane was layered onto the chloroform solution and the biphasic solution was allowed to sit at room temperature for 72 h, resulting in the precipitation of a yellow solid. The suspension was cooled in a −30° C. freezer for 4 h. The material was filtered, washed with hexane, and dried in vacuo to afford a yellow solid (254 mg, 16% yield).

$^1$H NMR (400 MHz, Chloroform-d) δ 12.4-11.4 (br s, 2H), 7.45 (s, 4H), 7.16 (dd, J=6.1, 3.1 Hz, 4H), 4.07 (s, 4H), 2.68 (t, J=6.3 Hz, 4H), 2.50 (s, 6H), 1.85 (p, J=6.4 Hz, 2H). $^{13}$C NMR (101 MHz, Chloroform-d) δ 152.17, 122.28, 56.40, 53.67, 42.68, 23.23. HRMS (ESI) Calculated for $C_{21}H_{26}N_6[M+H]^+$: 363.2292; found 363.2273.

Example 33: Synthesis of Dimethyl[(2S,2'S)-1,1'-bis((5-mesityl-1H-pyrrol-2-yl)methyl)-2,2'-bipyrrolidine]hafnium-Procatalyst 1

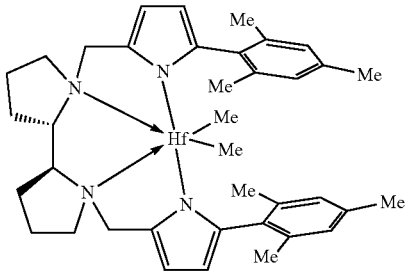

In a nitrogen-filled glovebox, a reaction vial was charged with (2S,2'S)-1,1'-bis((5-mesityl-1H-pyrrol-2-yl)methyl)-2,2'-bipyrrolidine (Lignad 3) (400 mg, 0.7480 mmol, 1 equiv.). The solid was dissolved in toluene (10 mL), and added to a vial containing bis(dimethylamino)bis(tetrahydrofuran)hafnium(IV) chloride (360.3 mg, 0.748 mmol, 1 equiv.). The (2S,2'S)-1,1'-bis((5-mesityl-1H-pyrrol-2-yl)methyl)-2,2'-bipyrrolidine vial was rinsed with toluene (2×5 mL) and this was added to the bis(dimethylamino)bis(tetrahydrofuran)hafnium(IV) chloride vial. The reaction was stirred at room temperature for 42 h. An off-white precipitate formed. The suspension was filtered and washed with toluene (5×1 mL). The solid was dried in vacuo to yield 367 mg of an off-white solid. Toluene (20 mL) was added to the vial containing the off-white solid. A 3 M solution of MeMgBr in $Et_2O$ (0.55 mL, 1.65 mmol, 2.2 equiv.) was added to the suspension, and the reaction was stirred at room temperature for 72 h. A clear solution was white precipitate was obtained. Over the weekend, the white solid material has formed a slight plug, floating on top of the clear solution. As a significant amount of solids were still present, the material was filtered. The filter cake was washed with toluene (3×5 mL). All volatiles were removed in vacuo, yielding approximately 370 mg of a white solid. The solid was triturated with toluene (10 mL). The solution was passed through a 0.45 μm syringe filter. The vial and filter were washed with toluene (2×5 mL). The combined organic phases were dried in vacuo, yielding a white solid (155.4 mg, 28% yield). NMR showed the material to be exclusively the desired LHfMe2 complex. However, all the material was not soluble in the benzene-d6. The solid was triturated with toluene (10 mL) and passed through a 0.45 μm syringe filter. The vial and filter were washed with toluene (2×2 mL). The combined organic phases were dried in vacuo, yielding a white solid (141.3 mg, 25% yield).

$^1$H NMR (400 MHz, Benzene-$d_6$) δ 6.95 (s, 2H), 6.84 (s, 2H), 6.23-6.12 (m, 4H), 3.53 (d, J=13.2 Hz, 2H), 3.05 (d, J=13.3 Hz, 2H), 2.97-2.90 (m, 2H), 2.60-2.47 (m, 2H), 2.42 (s, 6H), 2.37 (s, 6H), 2.19 (s, 6H), 1.29-0.92 (m, 8H), 0.54-0.40 (m, 2H), 0.17 (s, 6H). $^{13}$C NMR (101 MHz, Benzene-$d_6$) δ 140.81, 140.05, 137.19, 136.24, 135.76, 135.71, 128.34, 127.56, 110.52, 107.07, 68.51, 59.57, 55.83, 54.24, 23.82, 21.70, 21.53, 20.98, 20.87.

Alternative method (HfMe$_4$ metallation): In a nitrogen-filled glovebox, a 3 M solution of MeMgBr in $Et_2O$ (0.14 mL, 0.42 mmol, 4.5 equiv.) is added to a −30° C. stirring suspension of HfCl4 (29.9 mg, 0.0935 mmol, 1 equiv.) in toluene (1 mL). The reaction was stirred vigorously for 3 minutes, resulting in the formation of a gel. A −30° C.

solution of (2S,2'S)-1,1'-bis((5-mesityl-1H-pyrrol-2-yl)methyl)-2,2'-bipyrrolidine (50 mg, 0.0935 mmol, 1 equiv.) in toluene (1 mL) was added to the hafnium solution. The ligand vial was rinsed with additional toluene (0.5 mL), and this was added to the hafnium solution. The reaction was stirred for 18 h as it warmed to room temperature, during which time the solution turned dark black. The material was filtered, and the filter cake was washed with toluene (3×1 mL), yielding a light tan solution. The solution was further filtered via a 0.2 μm syringe filter, yielding a light yellow solution. All volatiles were removed from the filtrate in vacuo, yielding an off-white solid. NMR showed a mixture of desired product and another pyrrole containing species. The solid was partially dissolved in toluene (5 mL) and filtered through a 0.2 μm syringe filter, yielding a clear solution. All volatiles were removed in vacuo, yielding a white solid. NMR showed some of the byproduct was still present. The material was dissolved in toluene (2 mL), and hexane (10 mL) was added. The solution was filtered through a 0.2 μm syringe filter. The solution was stored in a −30° C. freezer for 16 h, resulting in the precipitation of a solid. The solution was filtered, washed with cold (−30° C.) hexane, and dried in vacuo to afford the product as a light tan solid (21.4 mg, 31% yield).

Example 34: Synthesis of Dimethyl[(2S,2'S)-1,1'-bis((5-mesityl-1H-pyrrol-2-yl)methyl)-2,2'-bipyrrolidine]zirconium-Procatalyst 2

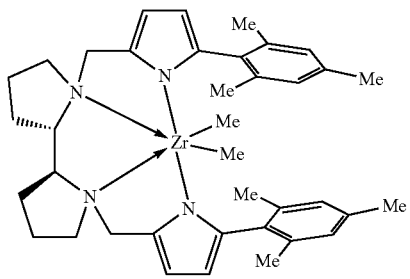

In a nitrogen-filled glovebox, a reaction vial was charged with (2S,2'S)-1,1'-bis((5-mesityl-1H-pyrrol-2-yl)methyl)-2,2'-bipyrrolidine (193 mg, 0.361 mmol, 1 equiv.). The solid was dissolved in toluene (5 mL), and added to a vial containing bis(dimethylamino)bis(tetrahydrofuran-2-yl)zirconium(IV) chloride (160.7 mg, 0.374 mmol, 1 equiv.). The (2S,2'S)-1,1'-bis((5-mesityl-1H-pyrrol-2-yl)methyl)-2,2'-bipyrrolidine vial was rinsed with toluene (5 mL) and this was added to the bis(dimethylamino)bis(tetrahydrofuran-2-yl)zirconium(IV) chloride vial. The reaction was stirred at room temperature for 22 h. A yellow precipitate formed. The suspension was filtered and washed with toluene (3×2 mL). The solid was dried in vacuo to yield 180.8 mg of a yellow solid. Toluene (10 mL) was added to the vial containing the light yellow solid. A 3 M solution of MeMgBr in Et$_2$O (0.26 mL, 0.794 mmol, 2.2 equiv.) was added to the suspension, and the reaction was stirred at room temperature for 72 h. A clear solution with an off-white precipitate was obtained. All volatiles were removed in vacuo. The solid was triturated with toluene (5 mL). The solution was passed through a 0.45 μm syringe filter. The vial and filter were washed with toluene (2×5 mL). The combined organic phases were dried in vacuo. The solid was triturated with toluene (6 mL) and passed through a 0.45 μm syringe filter. The vial and filter were washed with toluene (2×1 mL). The combined organic phases were dried in vacuo, yielding an off-white solid (95.2 mg, 40% yield).

$^1$H NMR (400 MHz, Benzene-d$_6$) δ 6.94 (s, 2H), 6.84 (s, 2H), 6.19-6.11 (m, 4H), 3.53 (d, J=13.2 Hz, 2H), 3.03 (d, J=13.3 Hz, 2H), 3.00-2.96 (m, 2H), 2.56-2.46 (m, 2H), 2.45 (s, 6H), 2.37 (s, 6H), 2.18 (s, 6H), 1.34-0.93 (m, 8H), 0.59-0.47 (m, 2H), 0.45 (s, 6H). $^{13}$C NMR (101 MHz, Benzene-d$_6$) δ 140.36, 139.76, 137.31, 136.38, 135.89, 135.68, 128.34, 127.59, 109.70, 106.96, 68.12, 56.24, 54.27, 54.17, 23.65, 21.53, 21.52, 21.01, 20.87.

Example 35: Synthesis of Bis(dimethylamido)[(2S,2'S)-1,1'-bis((5-mesityl-1H-pyrrol-2-yl)methyl)-2,2'-bipyrrolidine]hafnium-Procatalyst 5

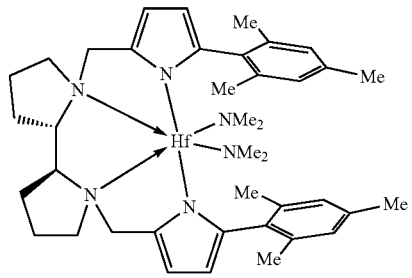

In a nitrogen-filled glovebox, a solution of tetrakis(dimethylamido)hafnium (199 mg, 0.5610 mmol, 1 equiv.) in toluene (5 mL) is added to a vial containing (2S,2'S)-1,1'-bis((5-mesityl-1H-pyrrol-2-yl)methyl)-2,2'-bipyrrolidine (300 mg, 0.5610 mmol, 1.0 equiv.). The tetrakis(dimethylamido)hafnium vial was washed with additional toluene (5 mL), and this was added to the ligand vial. The clear solution was stirred at room temperature for 2.5 h. The solution was passed through a 0.45 μm syringe filter, the filter was washed with additional toluene (2 mL), and all volatiles were removed in vacuo to yield an off-white solid (0.447 g, quantitative yield).

$^1$H NMR (400 MHz, Toluene-d$_8$) δ 6.88 (s, 4H), 6.21 (dd, J=2.8, 0.9 Hz, 2H), 6.13 (d, J=2.9 Hz, 2H), 3.62 (d, J=12.4 Hz, 2H), 3.24 (d, J=13.0 Hz, 2H), 3.16-3.10 (m, 2H), 3.01-2.86 (m, 2H), 2.74-2.68 (m, 2H), 2.65 (s, 12H), 2.33 (s, 6H), 2.31 (s, 6H), 2.25 (s, 6H), 1.52-1.20 (m, 6H), 0.87-0.74 (m, 2H). $^{13}$C NMR (101 MHz, Toluene-d$_8$) δ 140.53, 140.05, 137.60, 137.15, 135.41, 135.14, 127.88, 127.59, 111.49, 106.49, 66.99, 55.21, 54.12, 42.74, 23.93, 21.70, 21.68, 21.30, 20.74.

Example 36: Synthesis of Dimethyl[(2S,2'S)-1,1'-bis((5-(2,6-diisopropylphenyl)-1H-pyrrol-2-yl)methyl)-2,2'-bipyrrolidine]hafnium-Procatalyst 3

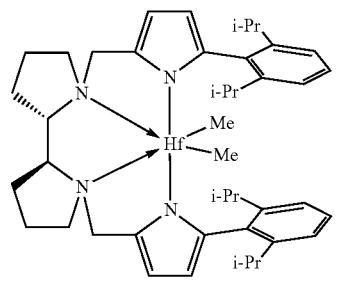

In a nitrogen-filled glovebox, a reaction vial was charged with (2S,2'S)-1,1'-bis((5-(2,6-diisopropylphenyl)-1H-pyrrol-2-yl)methyl)-2,2'-bipyrrolidine (300 mg, 0.4847 mmol, 1 equiv.). The solid was dissolved in toluene (6.5 mL), and added to a vial containing bis(dimethylamino)bis(tetrahydrofuran)hafnium(IV) chloride (233.5 mg, 0.4847 mmol, 1 equiv.). The (2S,2'S)-1,1'-bis((5-(2,6-diisopropylphenyl)-1H-pyrrol-2-yl)methyl)-2,2'-bipyrrolidine vial was rinsed with toluene (2×3 mL) and this was added to the bis(dimethylamino)bis(tetrahydrofuran)hafnium(IV) chloride vial. The reaction was stirred at room temperature for 42 h. Initially, a precipitate did not form quickly as in EXP-15-BE7500. However, upon prolonged stirring, a white precipitate formed. The suspension cooled in a −30° C. freezer for 6 h. The suspension was filtered and washed with cold hexane (2×1 mL). The solid was dried in vacuo to yield 207.4 mg of an off-white solid. Toluene (9 mL) was added to the vial containing the off-white solid. A 3 M solution of MeMgBr in Et$_2$O (0.36 mL, 1.07 mmol, 2.2 equiv.) was added to the suspension, and the reaction was stirred at 90° C. for 16 h. The reaction was allowed to cool to room temperature, and all volatiles were removed in vacuo. The solid was triturated with toluene (7 mL). The solution was passed through a 0.45 μm syringe filter. The vial and filter were washed with toluene (2×3 mL). The combined organic phases were concentrated in vacuo, yielding a white solid, approximately 200 mg. The solid was triturated with toluene (7 mL). The solution was passed through a 0.2 μm syringe filter. The filter clogged during the process. The vial and filter were washed with toluene (1×2 mL). The combined organic phases were concentrated in vacuo to yield a white solid (195.5 mg 49% yield).

$^1$H NMR (400 MHz, Toluene-d$_8$) δ 7.30-7.25 (m, 2H), 7.24-7.15 (m, 4H), 6.25-6.22 (m, 2H), 6.19-6.15 (m, 2H), 3.54 (dd, J=13.4, 1.4 Hz, 2H), 3.34 (hept, J=6.8 Hz, 2H), 3.27-3.13 (m, 4H), 3.06-2.97 (m, 2H), 2.75-2.57 (m, 4H), 1.48 (d, J=7.0 Hz, 6H), 1.38-1.35 (m, 2H), 1.34 (d, J=6.6 Hz, 6H), 1.28 (d, J=6.9 Hz, 6H), 1.24-1.14 (m, 4H), 1.07 (d, J=6.9 Hz, 6H), 0.66-0.57 (m, 2H), −0.00 (s, 6H). $^{13}$C NMR (101 MHz, Toluene-d$_8$) δ 150.42, 147.17, 139.42, 137.10, 136.56, 127.99, 122.16, 121.68, 112.47, 106.59, 68.69, 60.28, 56.22, 53.91, 30.61, 30.13, 27.19, 26.09, 23.88, 23.35, 22.14, 21.49.

Example 37: Synthesis of Dimethyl[N$^1$,N$^2$-bis((5-(2,6-diisopropylphenyl)-1H-pyrrol-2-yl)methyl)-N$^1$,N$^2$-dimethylethane-1,2-diamine]hafnium-Procatalyst 4

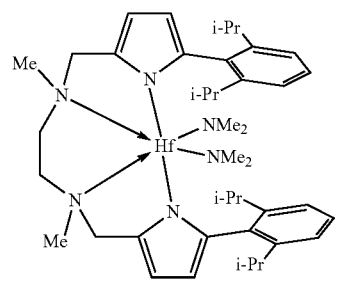

In a nitrogen-filled glovebox, a 3 M solution of MeMgBr in Et$_2$O (0.53 mL, 1.59 mmol, 4.5 equiv.) was added to a −30° C. stirring suspension of HfCl$_4$ (113 mg, 0.353 mmol, 1 equiv.) in toluene (4 mL). The reaction was stirred vigorously for 3 minutes, resulting in the formation of a gel. A −30° C. solution of N$^1$,N$^2$-bis((5-(2,6-diisopropylphenyl)-1H-pyrrol-2-yl)methyl)-N$^1$,N$^2$-dimethylethane-1,2-diamine (200 mg, 0.353 mmol, 1 equiv.) in toluene (4 mL) was added to the hafnium solution. The ligand vial was rinsed with additional toluene (1 mL), and this was added to the hafnium solution. The reaction was stirred for 18 h as it warmed to room temperature, during which time the solution turned dark black. The material was filtered, and the filter cake was washed with toluene (3×1 mL), yielding a light yellow solution. The solution was further filtered via a 0.45 μm syringe filter, yielding a light yellow solution. All volatiles were removed from the filtrate in vacuo, yielding a yellow solid. The solid was dissolved in toluene (5 mL) and filtered through a 0.45 μm syringe filter, then through a 0.2 μm syringe filter, yielding a light yellow solution. All volatiles were removed in vacuo, yielding an off-white solid with thick oil. The material was dissolved in toluene (3 mL), and hexane (15 mL) was added. The solution was filtered through a 0.45 μm syringe filter and stored in a −30° C. freezer for 18 h, however only a small amount of solid precipitated from solution. All volatiles were removed in vacuo, and the solid was dissolved in toluene (2 mL). Hexane (10 mL) was added, resulting in the precipitation of a solid. The solution was filtered through a 0.45 μm syringe filter. After filtration, the syringe and filter was washed with toluene (5 mL) to examine what solid precipitated. All volatiles were removed in vacuo, yielding an off-white solid (41 mg). NMR showed the material to be >95% pure product. The solid was dissolved in toluene (1 mL), diluted with hexane (5 mL), filtered through a 0.45 μm syringe filter, and stored in a −30° C. freezer for 18 h, resulting in the precipitation of a crystalline solid. The solid was filtered, washed with cold (−30° C.) hexane, and dried in vacuo to yield the desired product as a while solid (15.9 mg, 6% yield). The residual material in the crystallization vial was saved for a possible crystal structure. The filtrate from the initial toluene:hexane solution was stored in a −30° C. freezer for 18 h, resulting in the precipitation of a powder. The solid was washed with cold (−30° C.) hexane and dried in vacuo yielding a light yellow solid (17.1 mg, 6% yield). Combined yield: 33 mg, 12% yield.

$^1$H NMR (400 MHz, Toluene-d$_8$) δ 7.24 (t, J=7.6 Hz, 2H), 7.16 (ddd, J=13.2, 7.6, 1.5 Hz, 4H), 6.20 (d, J=2.8 Hz, 2H), 6.18-6.15 (m, 2H), 3.69 (d, J=13.4 Hz, 2H), 3.26 (hept, J=6.9 Hz, 2H), 3.09 (hept, J=6.7 Hz, 2H), 2.92 (d, J=13.6 Hz, 2H), 2.89 (d, J=9.6 Hz, 2H), 1.89 (s, 6H), 1.44 (d, J=6.9 Hz, 6H), 1.34-1.31 (m, 2H), 1.28 (d, J=6.7 Hz, 6H), 1.19 (d, J=6.9 Hz, 6H), 1.03 (d, J=6.7 Hz, 6H), −0.05 (s, 6H). $^{13}$C NMR (101 MHz, Toluene-d$_8$) δ 150.46, 147.13, 139.17, 136.85, 136.38, 128.03, 122.14, 121.71, 112.65, 106.70, 61.23, 58.94, 54.97, 44.22, 30.49, 30.12, 27.35, 26.09, 22.91, 21.93.

Example 38: Synthesis of Dimethyl[$N^1,N^2$-bis((1H-pyrrol-2-yl)methyl)-$N^1,N^2$-dimethylethane-1,2-diamine]hafnium-Comparative Procatalyst C1

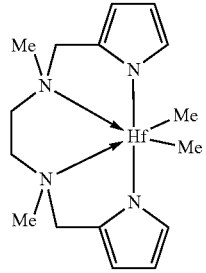

In a nitrogen-filled glovebox, a reaction vial was charged with $N^1,N^2$-bis((1H-pyrrol-2-yl)methyl)-$N^1,N^2$-dimethylethane-1,2-diamine (100 mg, 0.4059 mmol, 1 equiv.). The solid was dissolved in toluene (5.5 mL), and added to a vial containing bis(dimethylamino)bis(tetrahydrofuran)hafnium (IV) chloride (195.6 mg, 0.4059 mmol, 1 equiv.). The $N^1,N^2$-bis((1H-pyrrol-2-yl)methyl)-$N^1,N^2$-dimethylethane-1,2-diamine vial was rinsed with toluene (2×2 mL) and this was added to the bis(dimethylamino)bis(tetrahydrofuran)hafnium(IV) chloride vial. The reaction was stirred at room temperature for 18 h. The solution remained tan during the course of the reactions (the starting ligand was tan as well). No appreciable amount of precipitate formed during the reaction as was seen for mesityl or DIPP substituted analogues. All volatiles were removed in vacuo, yielding a red/brown solid. Toluene (11 mL) was added to the vial. A 3 M solution of MeMgBr in $Et_2O$ (0.30 mL, 0.893 mmol, 2.2 equiv.) was added to the suspension, and the reaction was stirred at room temperature for 20 h. Initially, the suspension was a red/brown color, which changed to dark brown after stirring overnight. All volatiles were removed in vacuo. The residue was dissolved in toluene (10 mL). A significant amount of salts remained insoluble. The mixture was filtered, and the filter cake was washed with toluene (2×5 mL). The brown solution was concentrated in vacuo. NMR was more complex than expected, containing multiple species. However, from the APT it appears that the desired complex was formed as a major product. The residue was dissolved in toluene (10 mL), passed through a 0.45 μm syringe filter, and concentrated in vacuo. The NMR spectrum was still showed multiple species. Toluene (3 mL) was added to the solid and stirred overnight, however all of the material did not dissolve. Additional toluene (1 mL) was added, but some solid still remained. Hexane (10 mL) was added and the solution was passed through a 0.45 μm syringe filter, yielding a clear, light brown solution. The solution was stored in a −30° C. freezer for 3 days, resulting in the precipitation of a solid. The solid was filtered, washed with cold (−30° C.) hexanes, and dried in vacuo to afford the product as a brown solid (53.6 mg, 29% yield).

$^1$H NMR (400 MHz, Benzene-$d_6$) δ 7.40-7.35 (m, 2H), 6.48-6.41 (m, 2H), 6.22-6.18 (m, 2H), 3.68 (d, J=13.4 Hz, 2H), 2.83 (d, J=13.4 Hz, 2H), 2.57 (d, J=9.3 Hz, 2H), 1.60 (s, 6H), 1.07 (d, J=9.1 Hz, 2H), 0.70 (s, 6H). $^{13}$C NMR (101 MHz, Benzene-$d_6$) δ 137.51, 129.05, 109.81, 106.35, 59.40, 57.71, 54.78, 43.86.

Example 39: Synthesis of Dibenzyl[(2S,2'S)-1,1'-bis((1H-benzo[d]imidazol-2-yl)methyl)-2,2'-bipyrrolidine]hafnium-Procatalyst 6

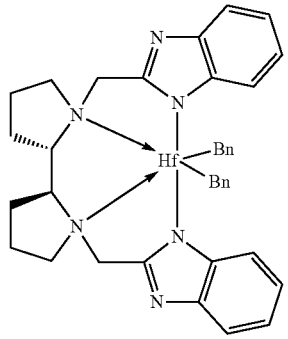

In a nitrogen-filled glovebox, a reaction vial was charged with (2S,2'S)-1,1'-bis((1H-benzo[d]imidazol-2-yl)methyl)-2,2'-bipyrrolidine (120 mg, 0.300 mmol, 1 equiv.). $HfBn_4$ (163 mg, 0.300 mmol, 1 equiv.) was dissolved in toluene (10 mL) and added to a vial containing the ligand. The $HfBn_4$ vial was rinsed with additional toluene (2×10 mL), and this was added to the reaction. The ligand did not immediately dissolved in solution. The suspension was stirred at room temperature for 18 h, yielding a hazy yellow solution. The solution was passed through a 0.4 μm syringe filter. The resulting clear yellow solution was concentrated to a volume of approximately 2 mL. Hexane (20 mL) was added, resulting in the precipitation of copious amounts of a solid. The suspension was cooled in a −30° C. freezer for 3 h. The solid was filtered, washed with hexane, and dried in vacuo to afford the product as an off-white solid (0.1627 g, 72% yield).

$^1$H NMR (400 MHz, Benzene-$d_6$) δ 8.11-7.99 (m, 4H), 7.33-7.22 (m, 4H), 6.89 (t, J=7.7 Hz, 4H), 6.72-6.63 (m, 6H), 3.62 (d, J=15.0 Hz, 2H), 3.49 (d, J=15.1 Hz, 2H), 2.60 (d, J=12.2 Hz, 2H), 2.55-2.38 (m, 6H), 2.31-2.16 (m, 2H), 1.09-0.95 (m, 2H), 0.93-0.79 (m, 2H), 0.62-0.43 (m, 2H), 0.26-0.11 (m, 2H). $^{13}$C NMR (101 MHz, Benzene-$d_6$) δ 161.38, 147.40 (br), 144.04 (br), 141.95, 128.78, 128.31, 123.38, 122.21, 121.95, 119.11, 115.15, 81.86, 70.89, 57.63, 54.53, 23.67, 21.41.

Example 40: Synthesis of Dibenzyl[$N^1,N^2$-bis((1H-benzo[d]imidazol-2-yl)methyl)-$N^1,N^2$-dimethylethane-1,2-diamine]hafnium-Procatalyst 7

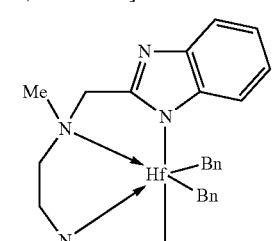

In a nitrogen-filled glovebox, a reaction jar was charged with $N^1,N^2$-bis((1H-benzo[d]imidazol-2-yl)methyl)-$N^1,N^2$-dimethylethane-1,2-diamine (100 mg, 0.287 mmol, 1 equiv.). $HfBn_4$ (155.8 mg, 0.287 mmol, 1 equiv.) was dissolved in toluene (10 mL) and added to a vial containing the ligand. The $HfBn_4$ vial was rinsed with additional toluene (2×10 mL), and this was added to the reaction. The ligand was reluctant to dissolve in the solution. The suspension was stirred at room temperature for 17 h, during which time the majority of ligand dissolved in solution, affording a hazy yellow solution. The solution was passed through a 0.4 μm syringe filter and concentrated to a volume of approximately 3 mL. Hexane (20 mL) was added, resulting in the precipitation of copious amounts of solid. The suspension was cooled in a −30° C. freezer for 1 h. The suspension was filtered, washed with hexane, and dried in vacuo to afford an off-white solid (0.1561 g, 77% yield).

$^1$H NMR (400 MHz, Benzene-$d_6$) δ 8.09-8.03 (m, 2H), 8.00-7.94 (m, 2H), 7.30-7.21 (m, 4H), 6.88 (t, J=7.7 Hz, 4H), 6.66 (t, J=7.4 Hz, 2H), 6.60 (d, J=7.4 Hz, 4H), 3.50 (d, J=15.5 Hz, 2H), 3.27 (d, J=15.5 Hz, 2H), 2.60 (d, J=12.5 Hz, 2H), 2.53 (d, J=12.6 Hz, 2H), 1.95-1.84 (m, 2H), 1.43 (s, 6H), 1.28-1.16 (m, 2H). $^{13}$C NMR (101 MHz, Benzene-$d_6$) δ 161.36, 147.14, 143.96, 141.69, 128.57, 127.67, 123.17, 122.24, 122.09, 119.28, 114.72, 86.05, 60.45, 57.67, 45.21.

Example 41: Polymers yielded from Procatalysts in the Batch Reactor

Catalyst activity (polymer yield) and resulting polymer characteristics were assessed for Procatalysts 1 to 3. The polymerization reactions were carried out in a 2-L semi-batch reactor.

TABLE 1

Reaction Conditions and Polymer Results

| Temp (° C.) | Press (psi) | Procatalyst Name | Procatalyst μmol | Ethylene Uptake (g) | Yield (g) | Efficiency (gpoly/ gMetal) | Mw g/mol | PDI | Octene mol % |
|---|---|---|---|---|---|---|---|---|---|
| 120 | 279 | Procat. 1 | 2.25 | 2 | 5.6 | 13,944 | 108,710 | 3.05 | 0.7 |
| 120 | 270 | Procat. 3 | 12 | 1.7 | 9.5 | 4,435 | 55,472 | 11.58 | 27.3 |
| 150 | 313 | Procat. 3 | 14 | 1.5 | 6.8 | 2,721 | 18,634 | 7.11 | 33 |
| 120 | 275 | Procat. 3 | 4.5 | 0.8 | 6 | 7,470 | 140,309 | 11.2 | 17.7 |
| 120 | 287 | Procat. 2 | 5 | 13.1 | 28.4 | 62,264 | 118,217 | 32.49 | 11.9 |

*The activator was Activator 1. Run time 10 minutes; 1.2 activator equivalent; MMAO-3A 10 micromoles.
**Standard batch reactor conditions for reaction temperature of: 120° C.-46 g ethylene (initial loading) and 300 g 1-octene in 609 g of IsoparE; 140° C.-43 g ethylene (inital loading) and 250 g 1-octene in 533 g of IsoparE, and 150° C.-46 g ethylene and 300 g of 1-octene in 546 g of IsoparE.
***Mol % Octene is defined as: (moles 1-octene incorporated into the polymer/(total moles 1-octene and ethylene)) × 100.

Example 42: Polymers yielded from Procatalysts in the PPR

The olefin polymerization reactions were carried out initially in a parallel polymerization reactor (PPR) using in situ generated complexes prepared from mixing a solution of ligand (Ligands 1 to 12) and metal precursor (ZrBn$_4$ or HfBn$_4$) in a 1:1 or 2:1 metal:ligand ratio for 30 mins before the polymerization experiments. Activator 1 was [HNMe(C$_{18}$H$_{37}$)$_2$][B(C$_6$F$_5$)$_4$] and added in amounts 1.5 equivalents relative to the metal (Zr or Hf). Activator 2 is B(C$_6$F$_5$)$_3$ and added in amounts of 5 equivalents relative to the metal (Zr or Hf). The data in Tables 2-4 was obtained at 120° C. and ethylene pressure of 150 psi, or 150° C. and ethylene pressures of 213 psi. The molar ratio of 1-octene and ethylene in the liquid phase was 2.24:1. The quench times were measured based on the time at which the reaction reached 50 (for 120° C. runs) or 75 (for 150° C. runs) psi ethylene uptake, or after 1800 seconds, whichever is first, and then the polymerizations were quenched with CO to quench the catalyst and end the experiment. The mol % octene is defined as: (moles 1-octene incorporated into the polymer/(total moles 1-octene and ethylene))×100. M:L refers to the amount of ligand added relative to ZrBn$_4$ or HfBn$_4$.

TABLE 2

Reaction Conditions and Polymer Results

| Metal | Catalyst Ligand | M:L | Activator (Act.) | Metal (μmol) | MMAO (μmol) | Octene mol % | Mw | PDI | Uptake | Yield (g) |
|---|---|---|---|---|---|---|---|---|---|---|
| HfBn$_4$ | Ligand 2 | 1:1 | Act. 1 | 0.1 | 0.5 | 9.7 | 470,427 | 6.5 | 30.983 | 0.037 |
| ZrBn$_4$ | Ligand 2 | 1:1 | Act. 1 | 0.1 | 0.5 | 5.2 | 392,752 | 41.97 | 50.061 | 0.065 |

TABLE 2-continued

Reaction Conditions and Polymer Results

| Metal | Catalyst Ligand | M:L | Activator (Act.) | Metal (μmol) | MMAO (μmol) | Octene mol % | Mw | PDI | Uptake | Yield (g) |
|---|---|---|---|---|---|---|---|---|---|---|
| $HfBn_4$ | Ligand 2 | 1:2 | Act. 1 | 0.1 | 0.5 | 13 | 367,549 | 4.33 | 26.709 | 0.047 |
| $ZrBn_4$ | Ligand 2 | 1:2 | Act. 1 | 0.1 | 0.5 | 5.6 | 373,374 | 29.17 | 17.094 | 0.021 |

*Reaction temperature was 120° C., and 0.503 micromoles of MMAO-3A was added as a scavenger.

TABLE 3

Reaction Conditions and Polymer Results

| Catalyst | | | Metal | Octene | | | | Yield |
|---|---|---|---|---|---|---|---|---|
| Metal | Ligand** | Activator | (μmol) | (mol %) | Mw | PDI | Uptake | (g) |
| $HfBn_4$ | Ligand 3 | Act 1 | 0.1 | 17.5 | 464,821 | 140.8 | 31.593 | 0.051 |
| $ZrBn_4$ | Ligand 3 | Act 1 | 0.1 | 4.2 | 367,315 | 50.7 | 50.061 | 0.062 |

*Reaction temperature was 120° C., the pressure was 150 psi; and 0.50 micromoles of MMAO-3A was added as a scavenger.
**The ratio of metal to ligand was 1 to 1 (1:1).

The olefin polymerization reactions were carried out in a parallel polymerization reactor (PPR) using isolated metal complexes. The results and data generated from the polymerization reactions are tabulated in Tables 5-7. Activator 1 was $[HNMe(C_{18}H_{37})_2][B(C_6F_5)_4]$ and added in amounts 1.5 equivalents relative to the metal (Zr or Hf). Activator 2 is $B(C_6F_5)_3$ and added in amounts of 5 equivalents relative to the metal (Zr or Hf). The molar ratio of 1-octene and ethylene in the liquid phase was 2.24:1. The quench times were measured based on the time at which the reaction reached 50 (for 120° C. runs) or 75 (for 150° C. runs) psi ethylene uptake, or after 1800 seconds, whichever is first, and then the polymerizations were quenched with CO to quench the catalyst and end the experiment. The mol % octene or $C_8$/olefin is defined as: (moles 1-octene incorporated into the polymer/(total moles 1-octene and ethylene))× 100.

TABLE 4

Reaction Conditions and Polymer Results

| Catalyst | Activator | Procatalyst (μmol) | Octene (mol %) | Mw | PDI | Uptake | Yield (g) |
|---|---|---|---|---|---|---|---|
| Procat. 1 | Act 1 | 0.1 | 0.4 | 97,336 | 3.34 | 50.366 | 0.064 |
| Procat. 1 | Act 2 | 0.1 | 1.7 | 106,723 | 2.99 | 50.061 | 0.059 |
| Procat. 2 | Act 1 | 0.1 | 3.4 | 14,769 | 3.04 | 50.519 | 0.086 |
| Procat. 2** | Act 1 | 0.45 | 8.7 | 18,668 | 6.03 | 75.092 | 0.113 |

*Reaction temperature was 120° C., the pressure was 150 psi; and 0.50 micromoles of MMAO-3A was added as a scavenger.
**Reaction temperature was 150° C., and the pressure was 213 psi.

TABLE 5

Reaction Conditions and Polymer Results

| Catalyst Procat. | Activator | Procatalyst (μmol) | Octene mol % | Mw | PDI | Uptake | Yield (g) | Quench Time (s) |
|---|---|---|---|---|---|---|---|---|
| Procat. 3 | Act 1 | 0.2 | 30.2 | 61,824 | 19.4 | 50.061 | 0.169 | 1333.1 |
| Procat. 3 | Act 2 | 0.2 | 5.7 | 64,395 | 2.3 | 19.536 | 0.027 | 1800.9 |
| Procat. 3 | Act 1 | 0.1 | 33.3 | 38,167 | 14.4 | 39.377 | 0.14 | 1800.11 |

*Reaction temperature was 120° C., the pressure was 150 psi; and 0.50 micromoles of MMAO-3A was added as a scavenger.

TABLE 6

| | Procatalyst | Octene | | | | Pressure | Temp | Yield |
| Catalyst | (μmol) | mol % | Mw | PDI | Uptake | (psi) | (° C.) | (g) |
| --- | --- | --- | --- | --- | --- | --- | --- | --- |
| Procat. 4 | 0.1 | 28 | 59418 | 9.14 | 50.061 | 150 | 120 | 0.16 |
| Procat. 4 | 0.15 | 27.8 | 34562 | 6.46 | 57.54 | 213 | 150 | 0.177 |

*The activator was Activator 1; and 0.50 micromoles of MMAO-3A was added as a scavenger.

The data tabulated in Table 7 are the results of the comparative procatalyst. The polymerization reaction was run in a PPR reactor, as previously described.

Comparative Procatalyst C1

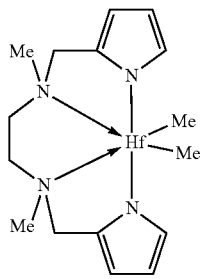

TABLE 7

| | Procatalyst | MMAO | | Pressure | Temp | Yield |
| Catalyst | (μmol) | (μmol) | Uptake | (psi) | (° C.) | (g) |
| --- | --- | --- | --- | --- | --- | --- |
| Procat. C1 | 0.1 | 0.5 | 2.442 | 150 | 120 | 0.006 |
| Procat. C1 | 0.1 | 0.5 | 1.221 | 150 | 120 | 0.005 |
| Procat. C1 | 0.1 | 0.5 | 1.526 | 150 | 120 | 0.005 |
| Procat. C1 | 0.15 | 0.75 | 2.442 | 213 | 150 | 0.006 |
| Procat. C1 | 0.15 | 0.75 | 1.374 | 213 | 150 | 0.004 |
| Procat. C1 | 0.15 | 0.75 | 2.289 | 213 | 150 | 0.005 |

When used in a polymerization process, the Procatalyst C1 produced less than 10 mg of polymer. Although the results indicated that there was an ethylene uptake, it was attributed to the solvation of ethylene and did not represent ethylene consumed by polymerization.

The invention claimed is:

1. A catalyst system comprising a metal-ligand complex according to formula (I):

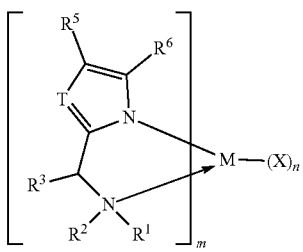

(I)

where

M is a metal chosen from zirconium or hafnium, the metal having a formal oxidation state of +2, +3, or +4;

each X is a monodentate or bidentate ligand independently chosen from unsaturated $(C_2\text{-}C_{50})$hydrocarbon, unsaturated $(C_2\text{-}C_{50})$heterohydrocarbon, $(C_1\text{-}C_{50})$hydrocarbyl, $(C_1\text{-}C_{50})$heterohydrocarbyl, $(C_6\text{-}C_{50})$aryl, $(C_4\text{-}C_{50})$heteroaryl, cyclopentadienyl, substituted cyclopentadienyl, $(C_4\text{-}C_{12})$diene, halogen, —N$(R^N)_2$, or —NCOR$^C$;

n is 1, 2, or 3;

m is 1 or 2;

the metal-ligand complex has 6 or fewer metal-ligand bonds;

each T is nitrogen or CR$^4$, wherein each R$^4$ is independently chosen from $(C_1\text{-}C_{50})$hydrocarbyl, $(C_1\text{-}C_{50})$heterohydrocarbyl, $(C_6\text{-}C_{50})$aryl, $(C_4\text{-}C_{50})$heteroaryl, —Si$(R^C)_3$, —Ge$(R^C)_3$, —P$(R^P)_2$, —N$(R^N)_2$, —OR$^C$, —SR$^C$, —NO$_2$, —CN, —CF$_3$, halogen, or —H;

each R$^1$ is independently selected from the group consisting of an aliphatic $(C_1\text{-}C_{50})$hydrocarbyl, an aliphatic $(C_1\text{-}C_{50})$heterohydrocarbyl, -halogen, or —H, and, when m is 2, two R$^1$ are optionally covalently connected to each other;

each R$^2$ is independently chosen from $(C_1\text{-}C_{50})$hydrocarbyl, $(C_1\text{-}C_{50})$heterohydrocarbyl, $(C_6\text{-}C_{50})$aryl, $(C_4\text{-}C_{50})$heteroaryl, —Si$(R^C)_3$, or —Ge$(R^C)_3$;

R$^1$ and R$^2$ are optionally covalently connected to form a ring structure;

each R$^3$ and each R$^5$ is independently chosen from $(C_1\text{-}C_{50})$hydrocarbyl, $(C_1\text{-}C_{50})$heterohydrocarbyl, $(C_6\text{-}C_{50})$aryl, $(C_4\text{-}C_{50})$heteroaryl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, halogen, or —H;

each R$^6$ is independently chosen from $(C_1\text{-}C_{50})$hydrocarbyl, $(C_1\text{-}C_{50})$heterohydrocarbyl, $(C_6\text{-}C_{50})$aryl, $(C_4\text{-}C_{50})$heteroaryl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, or halogen;

R$^5$ and R$^6$ are optionally covalently connected to form a ring structure; and each R$^C$, R$^P$, and R$^N$ in formula (I) is independently a $(C_1\text{-}C_{50})$hydrocarbyl.

2. The catalyst system according to claim 1, wherein:

each X is independently chosen from $(C_6\text{-}C_{20})$aryl, $(C_4\text{-}C_{20})$heteroaryl, $(C_4\text{-}C_{12})$diene, or a halogen; and each R$^6$ is independently chosen from $(C_6\text{-}C_{50})$aryl or $(C_4\text{-}C_{50})$heteroaryl.

3. The catalyst system according to claim 1, wherein R$^5$ and R$^6$ are covalently connected to form a six-member aromatic ring.

4. The catalyst system according to claim 1, wherein R$^5$ and R$^6$ are covalently connected to form a six-member aromatic ring; R$^3$ is —H; and R$^2$ is methyl.

5. The catalyst system according to claim 1, wherein each $R^6$ is anthracenyl, di-substituted anthracenyl, or tri-substituted anthracenyl.

6. The catalyst system according to claim 1, wherein each $R^6$ is phenyl or a substituted phenyl.

7. The catalyst system according to claim 1, wherein each $R^6$ is a substituted phenyl chosen from 2,4,6-trimethylphenyl; 2,6-di(iso-propyl)phenyl; 3,5-di-tert-butylphenyl, or 3,5-diphenylphenyl.

8. The catalyst system according to claim 1, wherein m is 2 and the metal-ligand complex has a structure according to formula (II):

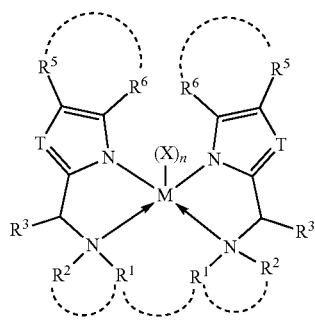

(II)

where M, T, $R^1$, $R^2$, $R^3$, $R^4$, $R^5$, $R^6$, and X are as defined in formula (I); n is 1 or 2; and the dotted lines indicate optional covalent connections.

9. The catalyst system according to claim 8, wherein:
M is zirconium or hafnium;
each X is independently chosen from $(C_6-C_{50})$aryl, $(C_6-C_{50})$heteroaryl, $(C_4-C_{12})$diene, or halogen;
each $R^1$ is independently chosen from $(C_1-C_{50})$hydrocarbyl, $(C_1-C_{50})$heterohydrocarbyl, or halogen, and each $R^2$ is independently chosen from $(C_1-C_{50})$hydrocarbyl, $(C_1-C_{50})$heterohydrocarbyl, $(C_6-C_{50})$aryl, or $(C_4-C_{50})$heteroaryl.

10. The catalyst system according to claim 8, wherein the two $R^1$ are covalently connected to each other; and each $R^2$ is independently $(C_1-C_{10})$alkyl.

11. The catalyst system according to claim 8, wherein the two $R^1$ are covalently connected as an alkylene chosen from —$CH_2CH_2$—, —$CH_2CH_2CH_2$—, or —$CH_2CH_2CH_2CH_2$—.

12. The catalyst system according to claim 1, wherein m is 2 and the metal-ligand complex has a structure according to formula (III):

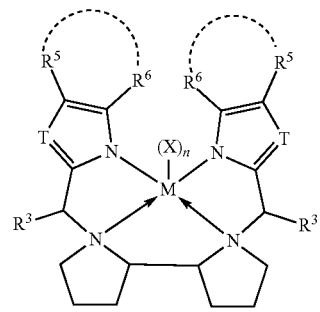

(III)

where M, T, $R^3$, $R^4$, $R^5$, $R^6$, and X are as defined in formula (I); n is 1 or 2; and the dotted lines indicate optional covalent connections.

13. The catalyst system according to claim 12, wherein each $R^6$ is independently chosen from carbazolyl, 3,5-di-tert-butylphenyl; 2,4,6-trimethylphenyl; 2,6-di-iso-propylphenyl; or 3,5-di-iso-propylphenyl.

14. The catalyst system according to claim 12, wherein each $R^6$ is 2,6-di-iso-propylphenyl.

15. The catalyst system according to claim 12, wherein each $R^6$ is 2,4,6-trimethylphenyl.

16. The catalyst system according to claim 1, wherein T is N.

17. The catalyst system according to claim 1, wherein T is $CR^4$, and $R^4$ is —H.

18. A polymerization process for producing an ethylene-based polymer, the polymerization process comprising:
polymerizing ethylene and at least one additional α-olefin in the presence of a catalyst system according to claim 1 and at least one activator to form a polymer.

19. The polymerization process according claim 18, wherein the activator comprises MMAO, bis(hydrogenated tallow alkyl)methylammonium tetrakis(pentafluorophenyl)borate, or tris(pentafluorophenyl)borane.

* * * * *